United States Patent
Meil

(10) Patent No.: US 9,268,889 B2
(45) Date of Patent: Feb. 23, 2016

(54) VERIFICATION OF ASYNCHRONOUS CLOCK DOMAIN CROSSINGS

(71) Applicant: International Business Machines Corporation, Armonk, NY (US)

(72) Inventor: Gavin B Meil, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/274,956

(22) Filed: May 12, 2014

(65) Prior Publication Data

US 2015/0161315 A1 Jun. 11, 2015

Related U.S. Application Data

(60) Provisional application No. 61/912,345, filed on Dec. 5, 2013.

(51) Int. Cl.
*G06F 17/50* (2006.01)

(52) U.S. Cl.
CPC ........ *G06F 17/5031* (2013.01); *G06F 17/5045* (2013.01); *G06F 17/5059* (2013.01); *G06F 2217/06* (2013.01); *G06F 2217/62* (2013.01); *G06F 2217/84* (2013.01)

(58) Field of Classification Search
CPC .................................................. G06F 17/5031
USPC .......................................... 716/108, 113, 134
See application file for complete search history.

(56) References Cited

U.S. PATENT DOCUMENTS

| | | |
|---|---|---|
| 5,210,700 A | 5/1993 | Tom |
| 5,452,239 A | 9/1995 | Dai et al. |
| 5,862,149 A | 1/1999 | Carpenter et al. |
| 6,175,946 B1 | 1/2001 | Ly et al. |
| 6,952,825 B1 | 10/2005 | Cockx et al. |
| 7,073,146 B2 | 7/2006 | Sarwary et al. |
| 7,089,518 B2 | 8/2006 | Bair et al. |
| 7,139,988 B2 | 11/2006 | Chard et al. |
| 7,243,322 B1 | 7/2007 | Ly et al. |
| 7,251,794 B2 | 7/2007 | Blanco et al. |
| 7,299,436 B2 | 11/2007 | Chu et al. |
| 7,333,926 B2 | 2/2008 | Schuppe |
| 7,356,789 B2 | 4/2008 | Ly et al. |
| 7,454,728 B2 | 11/2008 | Ly et al. |
| 7,484,192 B2 | 1/2009 | Ja et al. |
| 7,484,196 B2 * | 1/2009 | Ja et al. .................. 716/108 |

(Continued)

OTHER PUBLICATIONS

Schubert et al.,"Solutions to IBM POWER8 Verification Challenges", Jan. 2015, IBM J. Res. & Dev., vol. 59, No. 1, Paper 11, pp. 11:1-11:17.*

(Continued)

*Primary Examiner* — Sun Lin
(74) *Attorney, Agent, or Firm* — DeLizio Law, PLLC

(57) ABSTRACT

Various implementations of a method, system and computer program product receive a circuit model that can include an asynchronous crossing between a first set of one or more logic components in a first clock domain and a second set of one or more logic components in a second clock domain. A shadow network can be constructed that corresponds to the asynchronous crossing, where the shadow network includes at least one of an asynchronous transition detector, an asynchronous sample detector, and a metastability timer. The shadow network can include shadow network signals corresponding to signals of the asynchronous crossing.

20 Claims, 27 Drawing Sheets

(56) References Cited

U.S. PATENT DOCUMENTS

| | | | |
|---|---|---|---|
| 7,562,244 | B2 | 7/2009 | Wielage |
| 7,594,200 | B2 | 9/2009 | Eisner et al. |
| 7,877,717 | B2 | 1/2011 | Chu et al. |
| 7,882,473 | B2 | 2/2011 | Baumgartner et al. |
| 8,271,918 | B2 | 9/2012 | Kwok et al. |
| 8,407,636 | B2 | 3/2013 | Iwashita |
| 8,434,047 | B1 | 4/2013 | Jiang et al. |
| 8,438,516 | B2 | 5/2013 | Ly et al. |
| 8,438,517 | B2 | 5/2013 | Appleton et al. |
| 8,448,111 | B2 | 5/2013 | Mneimneh et al. |
| 8,533,541 | B2 | 9/2013 | Iwashita |
| 8,914,761 | B2 * | 12/2014 | Ly et al. .................. 716/113 |
| 2002/0152060 | A1 | 10/2002 | Tseng |
| 2007/0174805 | A1 | 7/2007 | Hsu et al. |
| 2008/0072188 | A1 * | 3/2008 | Ja et al. ..................... 716/4 |
| 2013/0132760 | A1 | 5/2013 | Talupuru et al. |
| 2013/0246985 | A1 | 9/2013 | Ly et al. |

OTHER PUBLICATIONS

Singh, Montek et al., "Generalized Latency-Insensitive Systems for Single-Clock and Multi-Clock Architectures", Design, Automation and Test in Europe Conference and Exhibition, 2004. Proceedings (vol. 2 ) montek@cs.unc.edu; theobald@cs.cmu.edu Feb. 2004, pp. 1008-1013.

Suhaib, Syed M. , "Formal Methods for Intellectual Property Composition Across Synchronization Domains", Dissertation submitted to the Faculty of the Virginia Polytechnic Institute and State University Aug. 29, 2007, 190 pages.

"U.S. Appl. No. 14/327,658 Office Action", Apr. 3, 2015, 9 pages.

Chakrabarty, et al., "Synthesis of Transparent Circuits for Hierarchical and System-on-a-Chip Test", National Science Foundation under grant No. CCR-9875324. pp. 1-6., 2001, 6 pages.

Cummings, "Clock Domain Crossing (CDC) Design & Verification Techniques Using SystemVerilog", Snug-2008, 2008, 56 pages.

Foulon, "CAD Flow for System on Chip", The 13th International Conference on Microelectronics Rabat, Morocco, pp. 241-244, Oct. 29-31, 2001, Oct. 2001, 4 pages.

Hari, et al., "Automatic Constraint Based Test Generation for Behavioral HDL Models", IEEE Transactions on Very Large Scale Integration (VLSI) Systems, vol. 16, No. 4, pp. 408-421, Apr. 2008, 14 pages.

Litterick, "Pragmatic Simulation-Based Verification of Clock Domain Crossing Signals and Jitter using SystemVerilog Assertions", Verilab & DVCon; https://www.verilab.com/files/sva_cdc_presentation_dvcon2006.pdf, 2006, 6 pages.

Narain, et al., "Clock Domain Crossing Demystified: The Second Generation Solution for CDC Verification", (Real Intent and Sunburst Design white paper), Mar. 13, 2008., 2008, 20 pages.

Ravi, et al., "Tao: Regular Expression-Based Register-Transfer Level Testability Analysis and Optimization", IEEE Transactions on Very Large Scale Integration (VLSI) Systems, vol. 9, No. 6, pp. 824-832, Dec. 2001, 9 pages.

Seshadri, et al., "An Integrated Approach to Behavioral-Level Design-For-Testability Using Value-Range and Variable Testability Techniques", International Test Conference, 1999. pp. 858-867., 1999, 10 pages.

Srinivas, et al., "Formal Verification of Digital Circuits Using Hybrid Simulation", IEEE Circuits and Devices Magazine, pp. 19-27, Jan. 1988, 9 pages.

* cited by examiner

| COMPONENT | SYMBOL | OUTPUT BEHAVIOR AT TIME T | COMMENTS |
|---|---|---|---|
| BUFFER | | Y(T)=A(T) | |
| INVERTER | | Y(T)=NOT( A(T) ) | |
| 2-WAY AND 420 | | Y(T)= AND( A(T), B(T) ) | |
| 2-WAY OR | | Y(T)= OR( A(T), B(T) ) | |
| 2-WAY XOR | | Y(T)= XOR( A(T), B(T) ) | HAVING A SEPARATE COMPONENT ALLOWS MORE PRECISE WAVEFORM CALCULATIONS |
| LATCH 424 | | Q(T)=D(T-1) IF C(T-1) == 1 ELSE Y(T-1) | SAMPLES WHEN THE CLOCK IS HIGH. THERE IS A UNIT DELAY FROM ANY CHANGE ON AN INPUT TO A CHANGE ON THE OUTPUT |
| FLIP-FLOP 428 | | Q(T)=D(T-1) IF C(T-1)==1 AND C(T-2)==0 ELSE Y(T-1) | SAMPLES WHEN THE CLOCK TRANSITIONS HIGH. THERE IS A UNIT DELAY FROM ANY CHANGE ON AN INPUT TO A CHANGE ON THE OUTPUT |
| UNIT DELAY BLOCK | | Y(T)=A(T-1) | REPRESENTS A SHORT (UNIT) DELAY. MAY BE USED TO CREATE A PULSED (CHOPPED) CLOCK FROM A NON-PULSED CLOCK |
| PATH DELAY BLOCK 432 | | Y(T)=A(T-N), 0<= N <=P; WHERE P IS AN UPPER BOUND | REPRESENTS A COMBINATIONAL PATH DELAY, WHICH IS TYPICALLY NOT KNOWN IN AN RTL MODEL, BUT IS ASSUMED TO HAVE SOME UPPER BOUND DETERMINED BY STATIC TIMING ANALYSIS. SOME EMBODIMENTS CAN INSERT THIS COMPONENT INTO THE RTL TO MODEL SUCH DELAYS. |
| PRIMARY INPUT | | Y(T) = UNKOWN | REPRESENTS AN INPUT TO THE CIRCUIT BEING CHECKED |
| PRIMARY OUTPUT | | | REPRESENTS AN OUTPUT OF THE CIRCUIT BEING CHECKED |
| CLOCK GENERATOR 436 | | Y OSCILLATES PERIODICALLY BETWEEN 0 AND 1 | REPRESENTS A CLOCK SOURCE WITHIN THE MODEL. ALTERNATIVELY, CLOCKS CAN BE SOURCED BY PRIMARY INPUTS |
| RANDOM BOX | | Y(T)=RANDOM | TYPICALLY ONLY USED IN VERIFICATION MODEL, NOT AN ACTUAL CIRCUIT. GENERATES A RANDOM ZERO OR ONE AT EACH UNIT OF TIME |
| ASSERT BOX | | | TYPICALLY ONLY USED IN VERIFICATION MODEL, NOT AN ACTUAL CIRCUIT. REPRESENTS A PROPERTY TO BE VERIFIED. |
| COVER BOX | | | TYPICALLY ONLY USED IN VERIFICATION MODEL, NOT AN ACTUAL CIRCUIT. REPRESENTS A CONDITION TO BE EXERCISED BY A SIMULATION |

FIG. 4

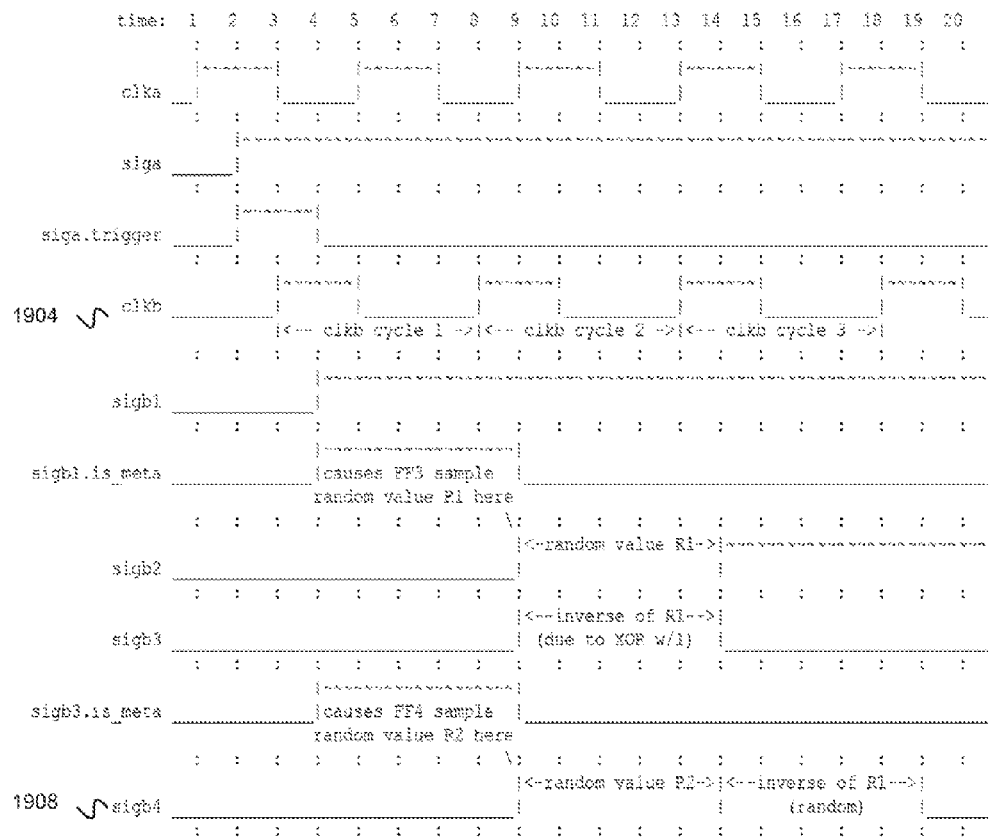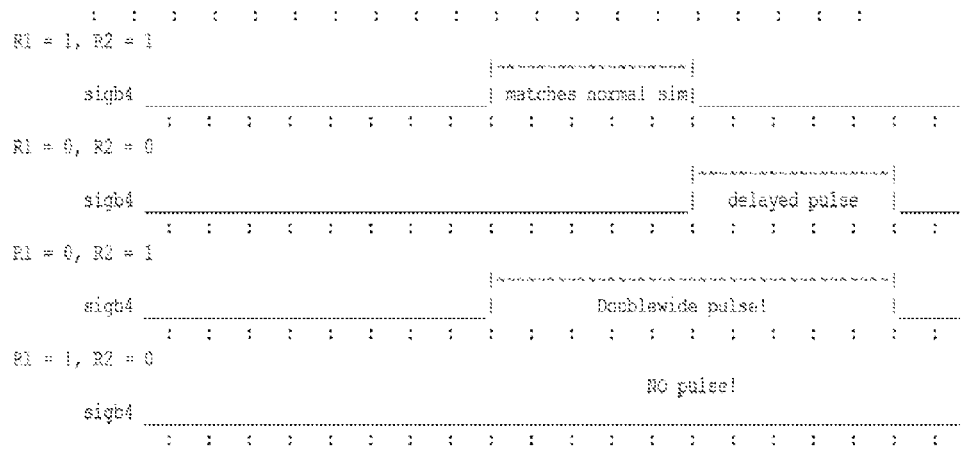
FIG. 19

VERIFICATION OF ASYNCHRONOUS CLOCK DOMAIN CROSSINGS

RELATED APPLICATIONS

This application claims the priority benefit of U.S. Provisional Application Ser. No. 61/912,345 filed Dec. 5, 2013.

BACKGROUND

Embodiments of the inventive subject matter generally relate to the field of circuit design, and, more particularly, to electronic design automation (EDA) tools to perform verification of asynchronous clock domain crossings.

EDA tools are used to evaluate chip designs prior to fabrication. The EDA process broadly consists of two steps. The first step is a check of the register transfer level (RTL) design logic. The second step is a creation of a physical circuit design from the RTL design. The first step, checking the design logic, can be referred to as RTL design checking. In RTL design checking, a language such as VHDL (VHSIC Hardware Description Language) or Verilog can be used to describe and model the logical behavior of a circuit. In some cases, a circuit design can be stored as a graph, the edges of which correspond to wires and the nodes of which correspond to circuit components. These edges can be referred to as nets, and the set of all elements that comprise the graph can be referred to as a netlist. RTL design checking itself can be decomposed into two steps. The first step is static checking and the second step is verification, which can also be referred to as dynamic checking. In static checking, the structure of the design is analyzed without simulating the behavior of the design. Conversely, in verification, the design is simulated by applying test patterns or stimuli to the inputs of the design to identify possible errors. Verification may also consist of a mathematical analysis of the state space of the design, known as formal verification or model checking, which attempts to perform the equivalent of applying all possible stimuli to the inputs of the design. Verification can be an expensive process for a complex chip or system on a chip. Verification can also be inconclusive, since it is often infeasible to apply all possible test patterns to the inputs of a complex design, or analyze its complete state space.

Chips and systems on chips continue to increase in complexity, comprising many systems and sub-systems. These systems and sub-systems might comprise multiple clock domains. A clock domain is a set of sequential logic elements, such as transparent latches and flip-flops, and combinational logic associated with these sequential logic elements that are clocked by a common clock or by clocks having common frequency and a fixed phase relationship. A clock signal causes a change in the state of sequential logic, such as a flip-flop or transparent latch. A clock domain crossing is a path from a sequential logic element or other source of state transitions in a design in a first clock domain to a sequential element in a second clock domain. The clock in the first domain may operate asynchronously with respect to the second clock domain. In such cases, when a data signal path crosses from the first clock domain to the second clock domain, the crossing is referred to as an asynchronous clock domain crossing.

Asynchronous clock domain crossings can be sources of error in chip design. Among the errors that can be propagated at asynchronous clock domain crossings are glitches and metastability. In general, a glitch occurs due to delays in inputs to a circuit component, in the delay inherent in a circuit component changing its output to reflect changes to its input, or both. For example, consider a first input and a second input to an AND gate. Assume that the first input at time t=1 is expected to transition to a 1 and the second input at time t=1 is expected to transition to a 0. However, if the second input is delayed, such that at time t=1, the second input is a 1 rather than a 0, then the output of the AND gate will be a 1 rather than the anticipated 0. Metastability occurs when a signal exists in an indeterminate state between a 0 and 1. This indeterminateness eventually is typically resolved over a period of time such that the probability of a signal remaining in an indeterminate state falls exponentially as a function of time.

SUMMARY

Various implementations of a method, system and computer program product receive a circuit model that can include an asynchronous crossing between a first set of one or more logic components in a first clock domain and a second set of one or more logic components in a second clock domain. A shadow network can be constructed that corresponds to the asynchronous crossing, where the shadow network includes at least one of an asynchronous transition detector, an asynchronous sample detector, and a metastability timer. The shadow network can include shadow network signals corresponding to signals of the asynchronous crossing. A first indicator can be transmitted on the shadow network in response to a transition occurring on a transmit element of the first set of one or more logic components. A second indicator can be received on the shadow network, where the second indicator specifies the occurrence of at least one of an asynchronous transition or potential glitch at an input of a receive element in the second set of one or more logic components.

BRIEF DESCRIPTION OF THE DRAWINGS

The present embodiments may be better understood, and numerous objects, features, and advantages made apparent to those skilled in the art by referencing the accompanying drawings.

FIG. 4 includes circuit components employed to implement an embodiment of the disclosure.

FIG. 19 illustrates a timing diagram associated with FIG. 18 according to an embodiment of the disclosure.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to modifying a netlist based verification model to accommodate the modeling of nondeterministic signals and the identification of glitches, a procedural model can be used in lieu of a netlist driven model. A procedural model consists of computer implementable processes. These processes are sensitized to certain signals such that when transitions occur in these signals, the processes are executed. Additionally, the examples described herein refer to a verification model that implements a time scale consisting of abstract units, referred to as time units. However, the disclosure also can be implemented in a model that implements physical time units. In other instances, well-known instruction instances, protocols, structures and techniques have not been shown in detail in order not to obfuscate the description.

Components can be implemented in an RTL verification model employing two value logic to detect and propagate asynchronous events, such as asynchronous transitions and potential glitches, and to model metastability. In some embodiments, these components can include one or more of an asynchronous transition detector (ATD), an asynchronous sample detector (ASD), a metastability timer, a random injector, a cover box, and an assert box. The components can be implemented in an RTL verification model so that they do not interfere with the RTL design. Accordingly, the components are referred to as shadow logic. Shadow logic can be comprised of two segments: an event network, which models asynchronous transitions and is comprised of ATDs and ASDs, and a metastability network, which can be comprised of random injectors and metastability timers, and models metastability. To model metastability, the shadow logic may also include X-channel logic gates. Conventional two value logic gates account for the logic 0 and logic 1 states. However, conventional two value logic gates cannot account for an indeterminate state, designated X. The X-channel logic gates can account for a signal that is in an indeterminate state between a logic value 0 and a logic value 1.

Figure 1:
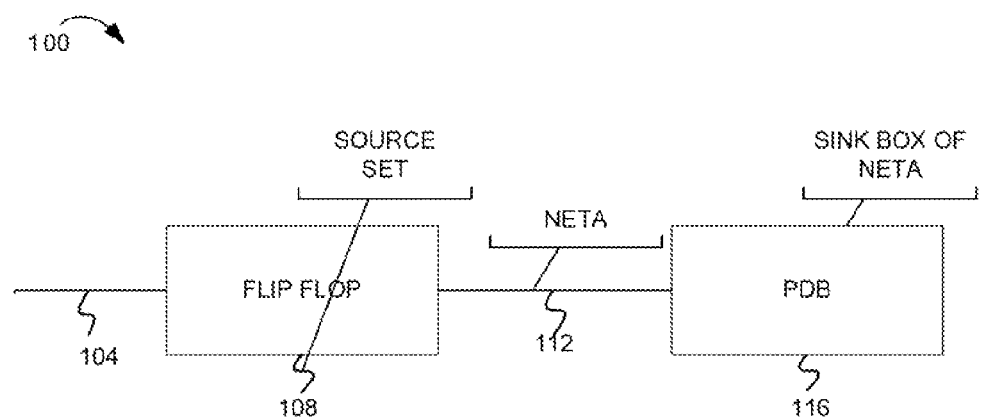
FIG. 1 is a conceptual diagram illustrating terminology used in example algorithms implemented to perform verification according to an embodiment of this disclosure.

FIG. 1 is an example circuit diagram 100 that illustrates terminology used in example algorithms adapted to implement the event network and the metastability network described in subsequent figures. The flip-flop 108 and path delay block 116 are referred to as boxes. The boxes 108, 116 also are referred to as nodes. The connectors 104, 112 are referred to as nets. The connector 104 is the input net to box 108, and the connector 112 is the output net to the box 108. Box 116 is the sink box of netA 112.

Figure 2:
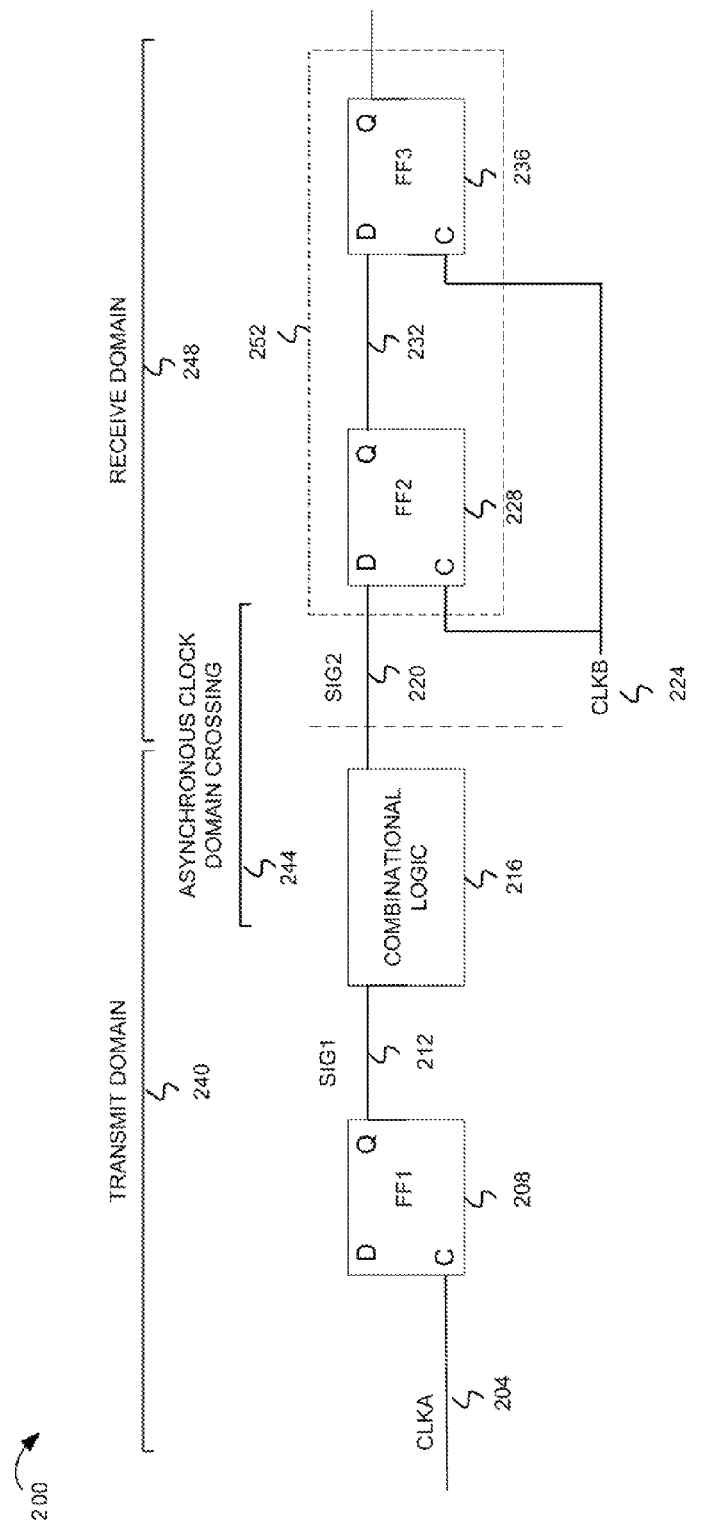
FIG. 2 is an example circuit diagram that illustrates terminology used in the example algorithms adapted to implement the shadow logic described in the disclosure.

FIG. 2 is an example circuit diagram 200 that illustrates terminology used in example algorithms adapted to implement the shadow logic described in subsequent figures. Flip-flop 208 is referred to as a transmit element, because it is the source of a signal at the transmit portion 240 of the asynchronous clock domain crossing 244. CLKA 204 is referred to as the transmit clock, since CLKA 204 governs state changes associated with the flip-flop 208. The transmit clock, the transmit element, and the combinational logic 216 each belong to the transmit domain 240. The signal SIG1 212, which is the first signal originating in the transmit domain 240 that can induce state transitions, is referred to as a transmit data signal. The flip-flop 228 is a receive element, because it is a sequential logic element at the receiving end of the asynchronous clock domain crossing 244. Flip-flop 236 can be referred to a stage two element. The flip-flop 228 may also be referred to as a stage one element, because it is the first flip-flop in the receive domain reached by the path from the transmit domain 240. If the design 200 included subsequent flip-flops after flip-flop 236, such flip-flops could be referred to as stage 3, 4, and N elements respectively. CLKB 224 is referred to as the receive clock, since the receive element is clocked by CLKB 224. The elements 224, 228, and 236 are in the receive domain 248. SIG2 220 is referred to as the receive data signal, since the receive element 228 samples the receive data signal 220. Flip-flops 228 and 236 constitute a synchronizer 252. As discussed elsewhere in the disclosure, the techniques described herein can be adapted to model metastability in a design. A signal is metastable if it fluctuates in an indeterminate state between a logic 0 and a logic 1. Eventually, such a signal settles to a determinate state, either a logic 0 or logic 1. Flip-flops 228 and 236 constitute a metastability path, which is a path from the receive element to a stage two element and possibly to additional stages.

Figure 3:
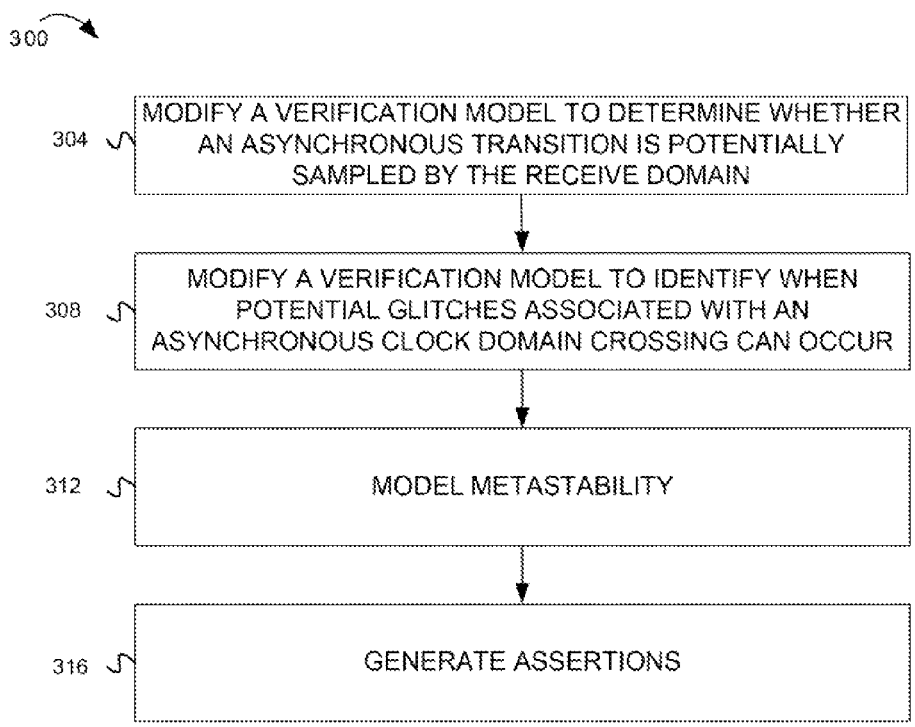
FIG. 3 is a flow chart illustrating example operations associated with an embodiment of the disclosure.

FIG. 3 is a flow chart 300 illustrating example operations to identify transitions at asynchronous clock domain crossings, such as glitches, and to model metastability. At block 304, a verification model of a design that includes at least one circuit is modified to determine whether an asynchronous transition is potentially sampled by a receive domain in the circuit. At block 308, the verification model is modified to include shadow logic that can be used to identify when potential glitches associated with an asynchronous clock domain crossing can occur. At block 312, metastability is modeled in the verification model. At block 316, assertions are generated in the verification model. Assertions are properties to be verified by a verification process such as simulation or formal verification.

FIG. 4 illustrates a table 400 of example circuit components that can be employed to model a circuit design. Column 408 is a symbol that is commonly used to represent the corresponding circuit component identified in column 404. Column 412 describes the relationship between inputs to the circuit component identified in column 404 and the output that the circuit component generates based on the inputs furnished to the circuit component. The transparent latch 424 is an example circuit component in table 400. Column 412 specifies the relationship between the inputs to the transparent latch 424 and the output that the transparent latch 424 generates. The transparent latch 424 takes two inputs: a data signal, represented by D, and a clock signal, represented by C. The clock signal can be generated by a clock generator 436 or other harmonic oscillator. The transparent latch 424 samples the data signal D when the clock signal equals 1. Thus, the output Q of the transparent latch 424 at time t, denoted Q(t), equals the data value D at time t−1, denoted D(t−1), when the clock at time t−1 takes a value of 1, denoted C(t−1)=1. Otherwise, the output Q of the transparent latch 424 does not change. In another embodiment, the transparent latch 424 samples the data signal D when the clock signal assumes a value of 0 rather than a value of 1.

The flip-flop 428 is another circuit component in table 400. Like the transparent latch 424, the flip-flop 428 receives two inputs, a data signal D and a clock signal C. The output Q of the flip-flop 428 equals the value of the data signal. The flip-flop 428 samples the data signal during a small interval of time when the clock signal transitions from a 0 to a 1, unlike the transparent latch 424, which continuously samples the data signal when the clock signal equals a 1. Thus, if the data signal has a value of 0 at the time at which the clock transitions from a 0 to a 1, then the output of the flip-flop 428 will become a 0. Otherwise, if the data signal has a value of 1 at the time at which the clock transitions from a 0 to a 1, then the output of the flip-flop 428 will become a 1. Column 412 specifies this relationship. The output of the flip-flop 428 Q(t) at time t equals the value of the data signal at time t−1, denoted D(t−1), if the clock signal at time t−1 denoted C(t−1)=1, and the clock signal at time t−2, denoted C(t−2)=0, thereby signifying a transition in the clock signal from a 0 to a 1. The flip-flop 428 can be modeled by two transparent latches 424. In some embodiments, the transparent latch 424 and flip-flop 428 each are modeled to include a unit delay such that the transparent latch 424 and flip-flop 428 express the output shown in column 412 after a unit has elapsed from the time of receipt of an input that causes a change in state of the output. In some embodiments, the combinational logic components of table 400 shown in FIG. 4, such as the AND gate 420, are modeled to have no delay between the time that the component receives an input and the time that the component generates an output based on the received input. However, any real combinational logic circuit component will typically exhibit a delay between receiving an input and generating an output. To model such a delay, some embodiments employ a path delay block (PDB) 432 to represent a nondeterministic, bounded delay on the time that elapses for a combinational circuit component to generate an output based on received inputs. The foregoing timing assumptions associated with the circuit components in table 400 can obviate any need to model physical time; hence, some embodiments permit modeling abstract time thereby conserving computational resources.

In one embodiment, certain assumptions concerning time can be programmed into the timing model. An asynchronous crossing latency is the delay from the active edge of the transmit domain clock to the arrival of data at the input of the sequential logic element in the receive domain. The minimum latency can be equal to the hold time of the receive element. The maximum latency can be determined by one of two timing rules. The first rule can be referred to as the timing to receive domain. The second rule can be referred to as the timing to faster domain. The timing to receive domain can assume that the maximum latency equals the receive clock period minus a guardband, as described below. The timing to faster domain can assume that the maximum latency equals the shorter of the receive clock period or the transmit clock period minus some guardband. The guardband can equal the sum of the setup time of the receive element and other time values to account for any clock uncertainty such as clock skew or clock jitter. The embodiments described below can be implemented in different programming languages and in the form of a computer program. For example, the asynchronous transition detector (ATD), metastability timer, random injector, shadow logic, and X-channel logic described below each can be implemented in VHDL, Verilog, or similar hardware-based description or programming languages.

Table 1 below provides example timing type attribute values that can be implemented, in one embodiment, to check aspects of a design associated with asynchronous clock domain crossings. A timing type attribute is a label that can be assigned to a net or node of a computer readable design to indicate some characteristic about a signal associated with a net or a component associated with a node. In one embodiment, the timing type attribute disclosed in U.S. Pat. No. 8,122,410 can be employed to implement aspects of embodiments associated with checking design parameters related to asynchronous clock domain crossings. The timing type attribute can be implemented as an enumerated class that contains multiple attribute values. When the timing type attribute is applied to a net or node, one of the values in the timing type class can be selected. The six example timing type attribute values provided in Table 1 are apropos to the present disclosure. The timing type value column provides a label for a timing type attribute used in some embodiments. The description column provides a description of a use for the corresponding timing type value.

TABLE 1

Timing Type Attributes

| Timing Type Value | Description |
|---|---|
| async_point2point | Specifies that the signal is part of an asynchronous control crossing that is inherently glitch-free because it originates from a single transmit element, and passes through no combinational logic. This also specifies that there is exactly one receive element downstream of the signal, which is the data input pin of a sequential element (latch or flip-flop). |
| async_glitchless | Specifies that the signal is part of an asynchronous control crossing but may be generated by a glitch-free combinational function over multiple transmit |

TABLE 1-continued

Timing Type Attributes

| Timing Type Value | Description |
|---|---|
| | elements. This also specifies that there is exactly one receive element downstream of the signal, which is the data input pin of a sequential element (latch or flip-flop). |
| async_reset | Specifies that the signal is part of an asynchronous control crossing that may be generated by a glitch-free combinational function over multiple transmit elements, and that feeds an asynchronous reset input of one or more sequential elements (or can otherwise force a sequential element into a reset state). |
| async_gated | Specifies that the signal is part of an asynchronous data crossing through which asynchronous transitions are gated (blocked) from being transmitted to receive latches. For example, there is a multiplexer or AND-gate that gates the crossing until the data is stable, so that the receive latch should never sample an asynchronous transition. |
| async_qualified | Specifies that the signal is part of an asynchronous data crossing that is not protected from metastability; therefore, the outputs of receive latches must be ignored until metastability has subsided, as qualified by a separate control mechanism. |
| async_other | Specifies an asynchronous crossing that does not fall into one of the preceding categories. This is generally not intended to be used, but is provided for situations that this invention has not anticipated, so that they may be addressed by extending the invention appropriately. |

Figure 5A:
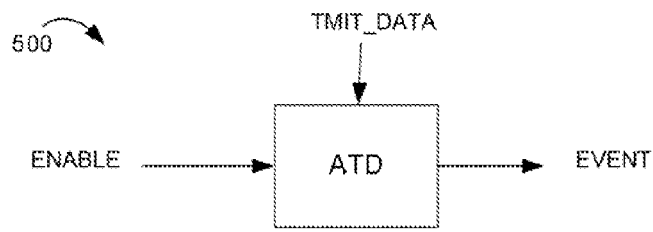
FIGS. 5A and 5B illustrate asynchronous transition detectors according to embodiments of the disclosure.

FIG. 5A illustrates an ATD 500 that can be used to detect asynchronous transitions in the transmit domain of a design. The ATD 500 has two inputs, tmit_data and enable. The first input, tmit_data, can be connected to a transmit data signal, which is a signal that is attached to the transmit element of an asynchronous clock domain crossing. The second input, the enable signal, assumes the value 1 if the tmit_data input is clocked by the transmit domain. However, if the transmit domain conditionally drives the tmit_data input, then, depending on the design's operating mode, the enable signal can be driven by a logical function that indicates when the design is in such an operating mode. The enable signal also permits selective disablement of transmit elements to, for example, debug verification failures. The ATD 500 has an output designated event. The event output is zero except if the enable input is one: then, the event output assumes a value of 1 for one time unit following any transition on tmit_data. This behavior is illustrated in the timing diagram 540 illustrated in FIG. 5C.

Figure 5B:
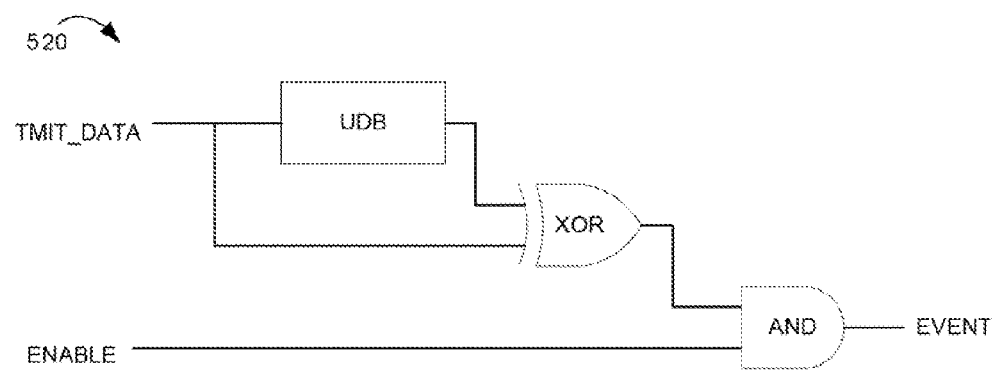
Figure 5C:
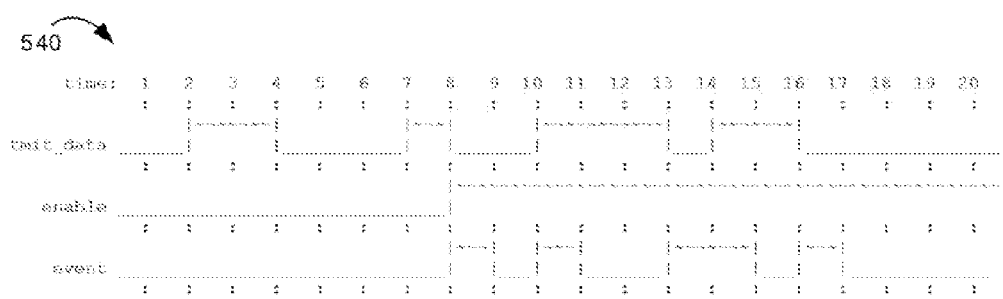
FIG. 5C is a timing diagram illustrating a timing behavior of an asynchronous transition detector.

FIG. 5B illustrates the implementation of the ATD 500 using circuit components 520, which in some embodiments can by any of the example circuit components illustrated in FIG. 4.

Figure 6A:
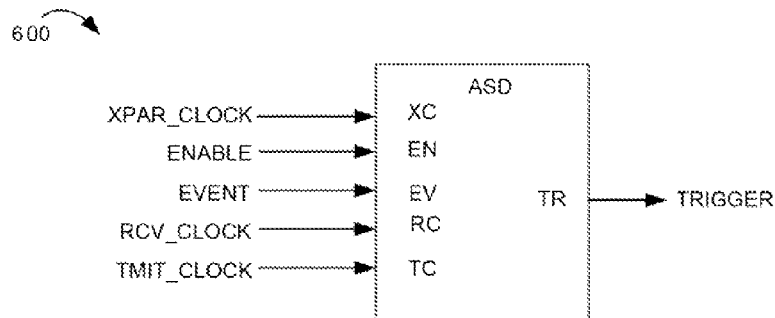
FIGS. 6A and 6B illustrate asynchronous sample detectors according to embodiments of the disclosure.

FIG. 6A illustrates an ASD 600. The ASD 600 receives an incoming event signal that signifies the occurrence of an asynchronous event, such as a transition or potential glitch, arriving at the receive data signal of an asynchronous clock domain crossing. The ASD 600 determines whether the asynchronous event can be potentially sampled by the corresponding receive element at the next receive clock edge. In some embodiments, the ASD 600 includes five inputs. The xpar_clock (XC) input assumes a value of 1 unless the corresponding receive element comprises a pair of transparent latches and there is a possibility that the clock connected to the first such latch can be gated. In the foregoing case, the XC input might be connected to the clock signal of the given transparent latch. The enable (EN) input enables operation of the ASD 600. When the EN input is set to zero, the trigger (TR) output also assumes a value of 0. However, the EN input generally assumes a value of 1 when the corresponding receive element is clocked by the receive domain of the design. Conversely, if the receive element is conditionally clocked by the receive domain, depending on the operating mode of the design, the EN input can be driven by a logical function that indicates when the circuit is in such an operating mode. As an example, the circuit design may employ a test mode, which when active forces all sequential elements to operate in a common test clock domain. In that case, the EN input can be driven to a value of 0 when the circuit is operating in test mode, and to a value of 1 when the circuit is operating in functional (non-test) mode. The EN input also can be employed to disable the effects caused by a potential sample at the corresponding receive element, which, in turn, can be used to debug possible verification failures. The event (EV) input is expected to assume a value of 1 for one unit of time to indicate the occurrence of an asynchronous event, such as a transition or a potential glitch. The rcv_clock (RC) input is driven by the positive-active clock of the receive domain. Thus, if the receive element samples on the low phase or falling edge of the receive clock, then the RC input is connected to the inversion of the receive clock. The tmit_clock (TC) input is driven by the positive-active transmit clock domain if the asynchronous crossing is timed according to the timing to faster domain rule as described in FIG. 4. If the asynchronous crossing is instead timed according to the timing to receive domain rule as described above with reference to FIG. 4, the tmit_clock input is expected to assume a value of 0.

Figure 6B:
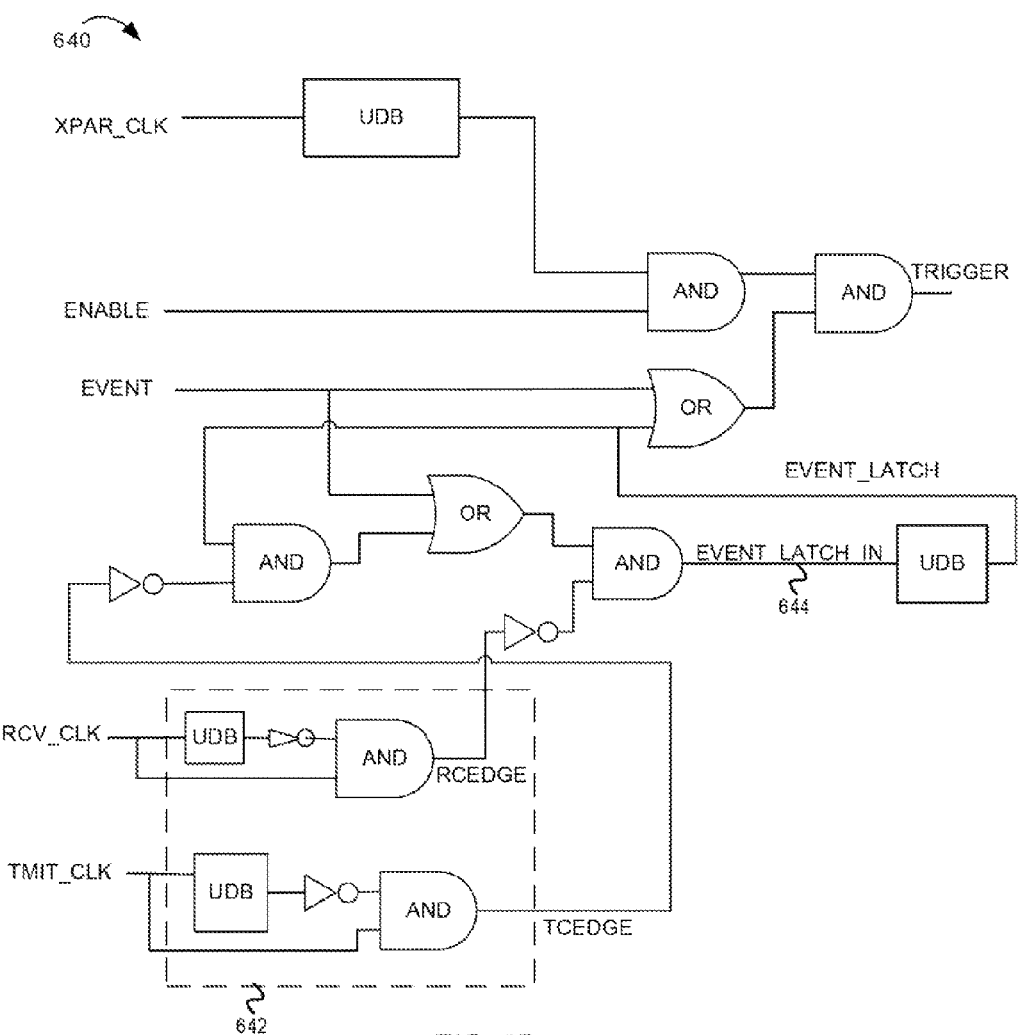

FIG. 6B illustrates an example implementation of the ASD 600 using circuit components 640, which can include some of the example circuit components shown in FIG. 4. In some embodiments, the logic enclosed by the dotted line 642, which generates the signals tcedge and rcedge, could alternatively be separated from the ASD component. This may reduce the amount of logic added to the verification model, because only one copy of the tcedge and rcedge signals are included per clock domain, instead of per ASD.

The behavior of the ASD (and its internal structure) may need to be modified slightly to be compatible with verification models which differ from the representative verification model. For example, if the verification model represents each sequential element as having a delta delay at its output instead of a unit delay, as might be the case for an event-based simulator, then it is likely that the equation for the event_latch_in signal 644 in FIG. 6B would need to be changed to the following:

event_latch_in=event or (event_latch AND not (rcedge) AND not(tcedge))

Those of skill in the art having the benefit of the disclosure can make such adjustments based on the intended function of the ASD 600 as described herein.

Figure 7A:
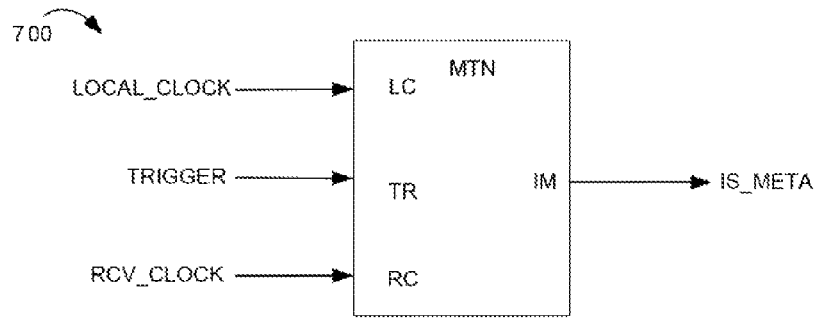
FIGS. 7A, 7B and 7C illustrate metastability timers according to embodiments of the disclosure.

FIG. 7A illustrates a metastability timer 700. A metastability timer 700 can be implemented to measure the number of receive clock periods that elapse during which a signal in the metastability path, such as the output of the receive element, might be metastable. FIG. 7A depicts a symbol for a metastability timer, independent of its implementation. The symbol is labeled with a variable denoted MTN, where N represents the number of receive clock periods during which the metastability can endure. For example if N is set to one, then the metastability can endure for at most one receive clock period, and the symbol for the metastability timer would be labeled MT1. If N is set equal to one for a metastability timer corresponding to the receive element of an asynchronous clock domain crossing, then the metastability can endure at the output of the receive element for at most one receive clock period. Hence, a sequential logic element such as a transparent latch or flip-flop that receives signals driven by the receive element may sample a metastable value on the next clock edge. Following the next clock edge, the receive element is assumed to either have sampled a new value (assuming it is not clock-gated) or any metastability has settled to a deterministic value (i.e. a 0 or a 1). In one embodiment, a user can set N to an arbitrary whole number value. In some embodiments, the metastability timer 700 can include three inputs. The Local_Clock (LC) input is connected to the positive active version of the clock signal that is clocking the receive element provided that the clock can be functionally gated relative to the receive domain clock. The foregoing assumes that the receive domain is clocked by a continuously operating clock but that the clock signals feeding individual sequential logic elements may be disabled on any given clock period to prevent the element from sampling a new value during the clock period. If the clock signal that is clocking the receive element cannot be functionally gated, then the clock input is expected to assume a value of 1, and a metastability timer 700 with N=1 can be used. The trigger (TR) input can be connected to the trigger output of the ASD corresponding to the receive element. The receive clock (RC) input can be connected to the ungated version of the receive clock. The metastability timer 700 includes an output referred to as is_meta (IM) output. The is_meta output provides a value of one for the duration of any receive clock period in which the corresponding receive element can be presumed to be in a potentially metastable or nondeterministic state.

Figure 7B:
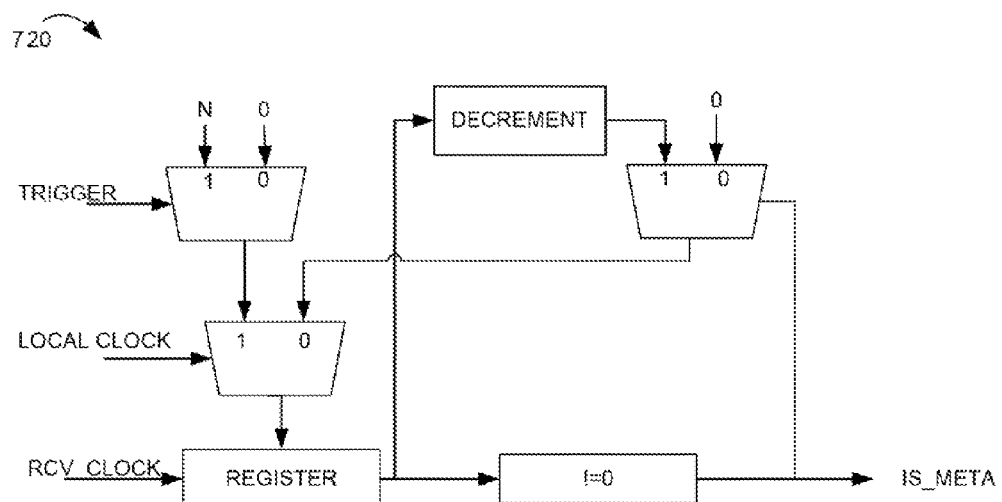

FIG. 7B depicts an example implementation 720 of a metastability timer 700, using components such as a register, decrementer, and multiplexer, which can be implemented using the fundamental circuit components from FIG. 4.

Figure 7C:
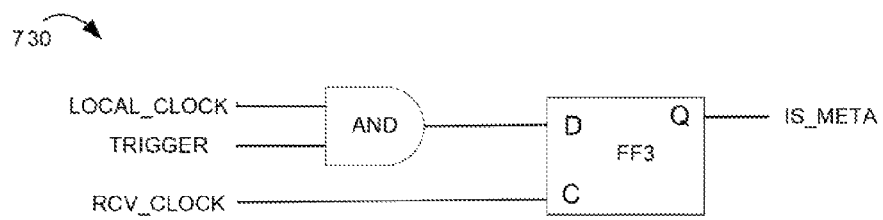

FIG. 7C depicts a possible implementation of a single cycle metastability timer 730; i.e., a metastability timer for N=1.

Figure 8A:
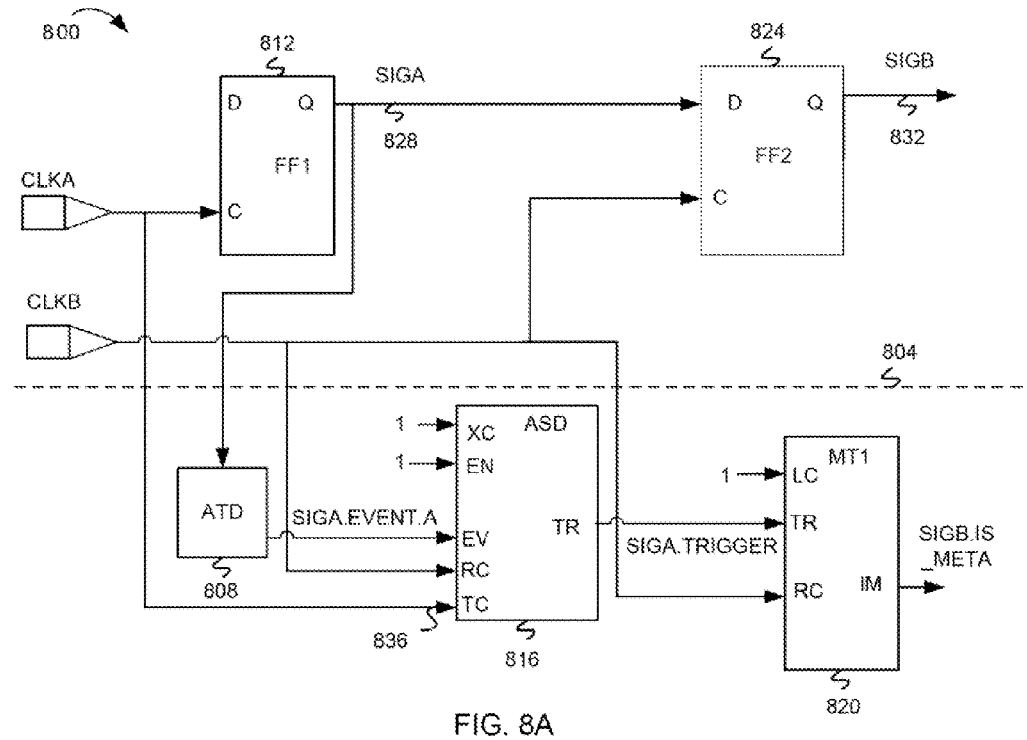
FIGS. 8A and 8B illustrate shadow logic applied to an example circuit design according to an embodiment of the disclosure.

FIG. 8A depicts an example design 800 in which shadow logic is employed in a machine readable circuit design. The term shadow logic refers to components that are added to the RTL verification model by an embodiment to model the effects of asynchronous clock domain crossings. The shadow logic corresponds to ("shadows") components in the design being verified, but it does not interfere with the design. The circuit components below the dotted line 804 comprise the shadow logic in the example design 800. In one embodiment, an ATD 808 can be added for each transmit element in the design. The example design 800 includes a single transmit element, the flip-flop 812. Hence, one ATD 808 can be included as a component of the shadow logic. In FIG. 8A and subsequent figures, the ATD 808 is shown as having one input, which corresponds to the tmit_data input described in FIG. 6A. In this example case, the enable input to the ATD 808 is presumed to be tied to 1. An implementation may alternatively connect the enable input to a different signal as explained above with reference to FIG. 6A. An ASD 816 and a metastability timer 820 can be added for each receive element in the design. In the example design 800, the flip-flop 824 is the sole receive element. Hence, one ASD 816 and one metastability timer 820 can be included in the shadow logic.

Figure 8B:
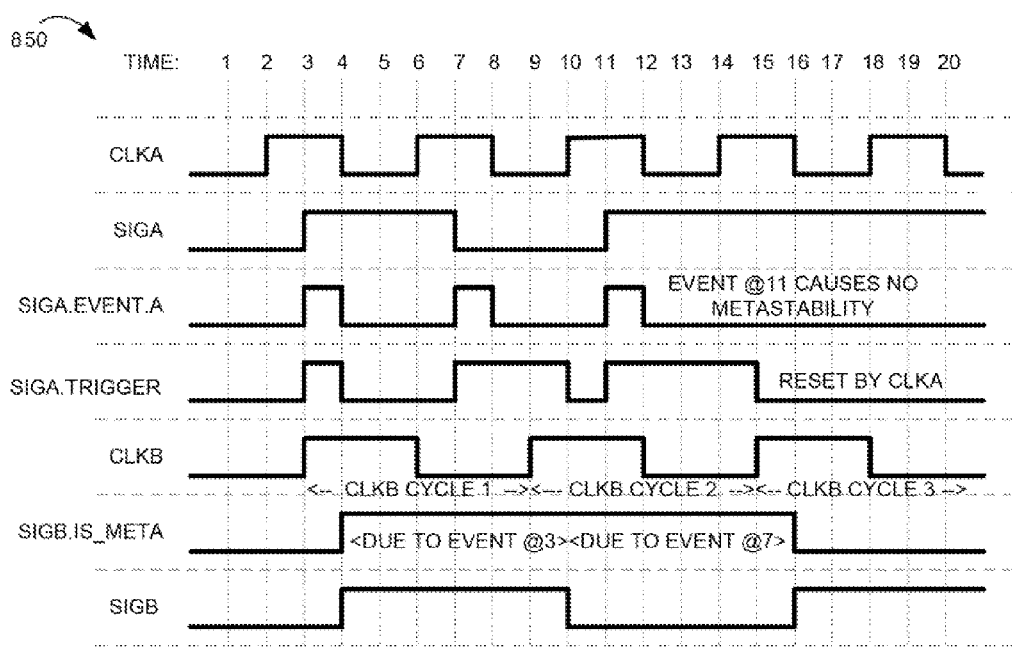

FIG. 8B is a timing diagram 850 that depicts the operation of the shadow logic illustrated in FIG. 8A. As shown in FIG. 8B, the transition on siga at time 3, launched by the clka edge at time 2, is potentially sampled by flip-flop 824 (FIG. 8A) at the first clkb edge that follows the clka edge at time 2, which occurs at time 3. This causes sigb.is_meta to assume a value of 1 during the first cycle of clkb. Likewise, the transition on siga at time 7 is potentially sampled by the clkb edge at time 9, causing sigb.is_meta to assume a value of 1 during the second cycle of clkb. The transition on siga at time 11 is not potentially sampled due to the use of the timing to faster domain rule as described in FIG. 4. The siga.trigger is reset at time 15 due to the clka edge at time 14. Accordingly, siga will be stable when the receive element samples siga at time 15. If the crossing had been analyzed using the timed to the receiving domain rule described in FIG. 4, in which the TC input 836 to the ASD 816 (FIG. 8A) is tied to 0, then siga.trigger would remain at a value of 1 until time 16. At time 16, sigb.is_meta would assume a value of 1 for the third clock cycle of clkb, indicating that the circuit is potentially metastable during the third cycle of clkb. In the example described above, it is noted that the receive element could, according to the sigb.is_meta signal, become metastable for two consecutive clock cycles.

The above example is a simplified case, assuming no combinational logic in the crossing. A process for handling such logic and an algorithm for generating the shadow logic in the verification model for such logic will be described below with reference to FIG. 15.

Figure 9:
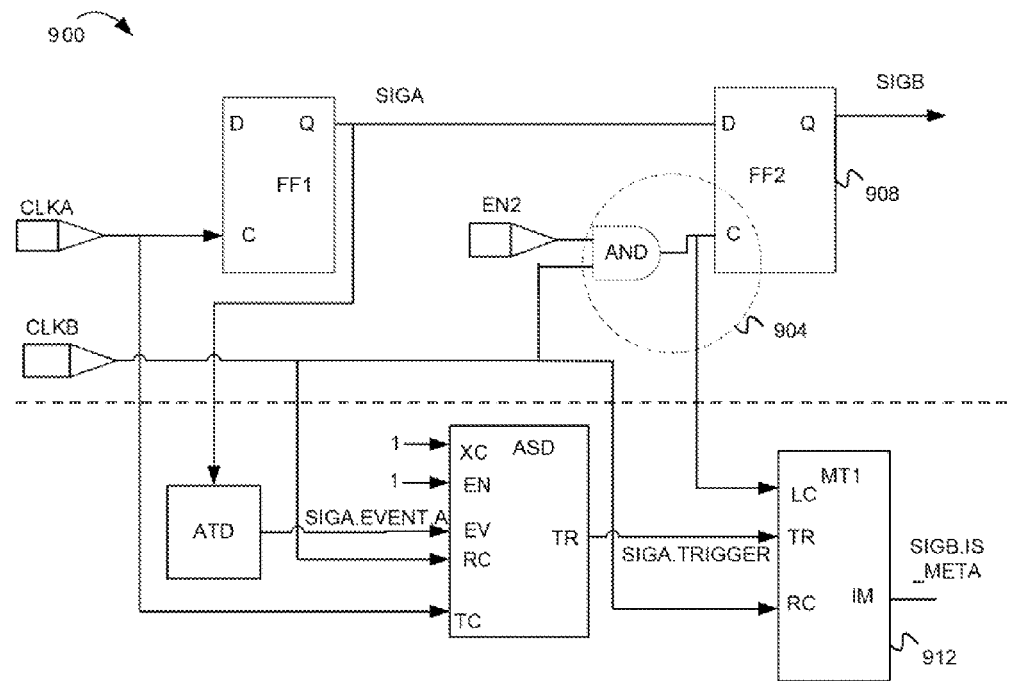
FIG. 9 illustrates shadow logic applied to a circuit design that includes a gated clock according to an embodiment of the disclosure.

FIG. 9 depicts use of shadow logic in an example circuit design 900 that includes a gated clock, highlighted through the inset 904. If a circuit design includes a gated clock, then the clock input of the receive element can be connected to a metastability timer. Thus, in the example of FIG. 9, the receive element, flip-flop 908, is connected, via its clock input, to the LC input of metastability timer 912. The foregoing permits the metastability timer 912 to receive information about when a receive element, such as flip-flop 908 in the example design 900, samples its input so that the metastability timer 912 can determine when a receive element, such as flip-flop 908, enters a metastable state or exits a metastable state.

Figure 10:
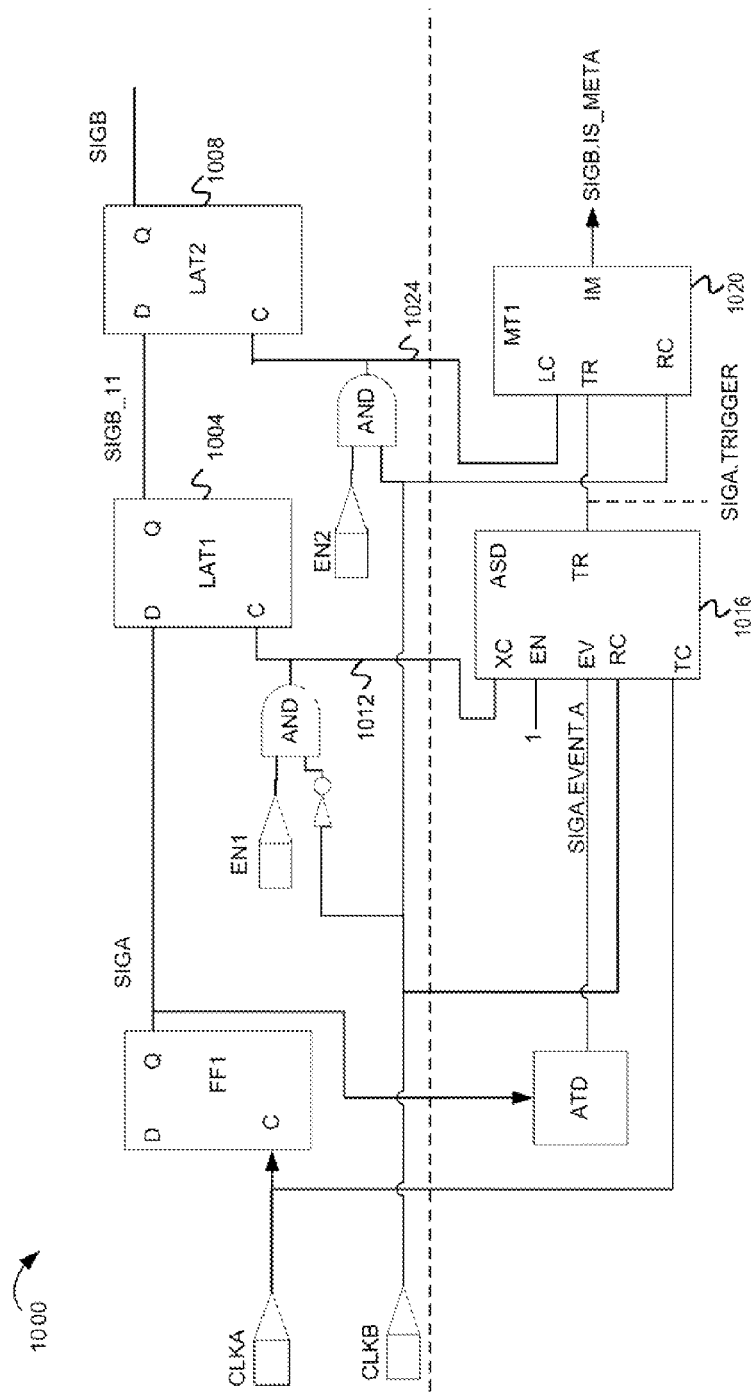
FIG. 10 illustrates shadow logic applied to a circuit design that includes transparent latches according to an embodiment of the disclosure.

FIG. 10 depicts use of shadow logic in an example circuit design 1000 that includes a first transparent latch 1004 and a second transparent latch 1008 wherein the clock input to the first transparent latch 1004 and to the second transparent latch 1008 is a gated clock. In a design in which the clock input to a receive element transparent latch is clock gated, like the transparent latch 1004, then a transparent latch is connected to an ASD. In the example circuit design 1000, the first transparent latch 1004 is connected to the ASD 1016 as depicted via connector 1012. If a subsequent receive side transparent latch is clock gated, then the subsequent receive side transparent latch can be connected to a metastability timer. For example, the second transparent latch 1008 can be connected to the metastability timer 1020 via connector 1024.

Tables 2 and 3 below can be used to implement a method to account for a potential glitch or a metastable state. A logical function typically assumes either a value of a 0 or a 1 at any given instant of time. However, in some cases, the state of the logical function can be indeterminate. The information in Tables 2 and 3 can be used to account for this third indeterminate state.

Table 2 provides data to implement a method, called binary/x encoding, to encode a signal capable of assuming three values. Column "3-Value of sig1" shows a signal, denoted sig1, that can assume one of three values: a 0, 1, or X. X represents an indeterminate state. Sig1 can be split into two signals. The first signal, shown in column "2-Value of sig1.bin", can be referred to as a binary coordinate. The second signal, shown in column "2-Value of sig1.x", can be referred to as an X coordinate. The symbol "–" means that the state of the signal is irrelevant, also known as a "don't care."

TABLE 2

| 3-Value of sig1 | 2-Value of sig1.bin | 2-Value of sig1.x |
|---|---|---|
| 0 | 0 | 0 |
| 1 | 1 | 0 |
| X | — | 1 |

Table 3 is a truth table that depicts application of the binary/x encoding to a two input AND gate. Column A is the first input, denoted input A, to the AND gate. As shown in Table 3, input A can assume one of three values: a 0, 1, or X. Each value can be represented as a two coordinate encoded value. The first coordinate is a binary coordinate and the second coordinate is an X coordinate. For example, the 0 value of signal A can be expressed in encoded form as (0,0), the 1 value can be expressed in encoded form as (1,0), and the X value can be expressed in encoded form as (—, 1), where 1 represents that the signal exists in an indeterminate state. The same principle applies to the second input to the AND gate, denoted as the B signal in column B. Column Y represents the result of finding the AND of the first signal A and the second signal B. Rows in Table 3 show the result of the AND function applied to at least one input that includes an indeterminate state X.

TABLE 3

| A (A.bin, A.x) | B (B.bin, B.x) | Y (Y.bin, Y.x) |
|---|---|---|
| 0 (0, 0) | 0 (0, 0) | 0 (0, 0) |
| 0 (0, 0) | 1 (1, 0) | 0 (0, 0) |
| 0 (0, 0) | X (—, 1) | 0 (0, 0) |
| 1 (1, 0) | 0 (0, 0) | 0 (0, 0) |
| 1 (1, 0) | 1 (1, 0) | 1 (1, 0) |
| 1 (1, 0) | X (—, 1) | X (—, 1) |
| X (—, 1) | 0 (0, 0) | 0 (0, 0) |
| X (—, 1) | 1 (1, 0) | X (—, 1) |
| X (—, 1) | X (—, 1) | X (—, 1) |

Figure 11A:
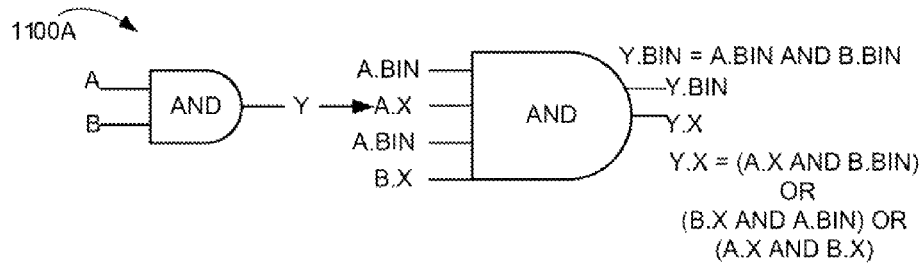
FIGS. 11A, 11B and 11C illustrate X-channel logic according to embodiments of the disclosure.
Figure 11B:
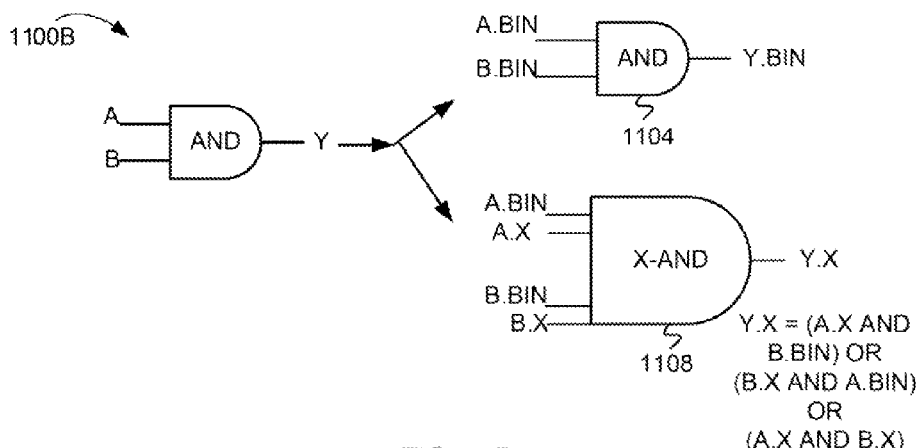
Figure 11C:
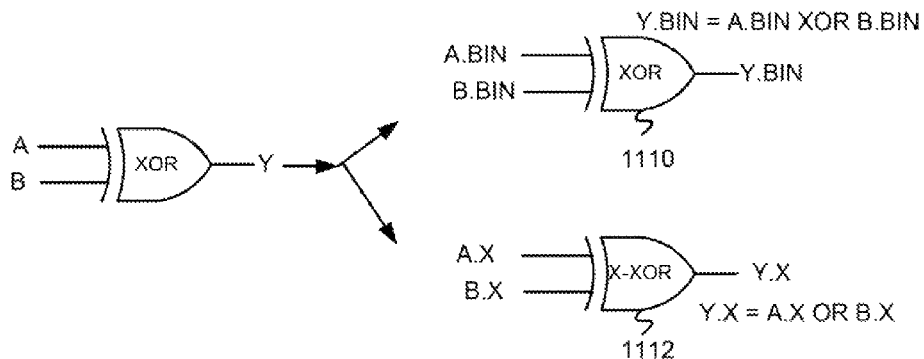

FIGS. 11A, 11B, and 11C depict circuit components to implement logical functions using the binary/X encoding of Table 3 for an RTL verification model. A gate that generates the x coordinate output can be referred to as an X channel gate, and a plurality of such gates can be collectively referred to as X channel logic.

FIG. 11A illustrates a binary/X-encoded 3-value AND gate. In one embodiment as depicted in FIG. 11A, a two input logic gate can be expressed in binary/x encoding form by including the binary input and the x input and the binary output and x outputs in a single logic gate.

FIG. 11B illustrates a 2-value AND gate 1104 with an X-channel AND gate 1108. The embodiment illustrated in FIG. 11B depicts an alternative approach to that illustrated in FIG. 11A. In the approach illustrated in FIG. 11B, a single logic gate can be expressed in a form that includes two logic gates: a first gate 1104 that produces the binary coordinate output and a second gate 1108 that produces the x coordinate output. In one embodiment, the approach shown in FIG. 11B is implemented and can be combined with shadow logic to model potential glitches or metastable behavior as described below.

FIG. 11C illustrates a 2-value XOR gate 1110 with an X-channel XOR gate 1112. As can be seen from FIG. 11C, for some logical functions such as the XOR function, the gate 1112 that generates the X coordinate output has no dependency on the binary coordinates of its inputs.

Those of skill in the art having the benefit of the disclosure will appreciate that other circuit components can be used to implement X-channel logic. For example, the X-channel gate corresponding to a buffer or inverter is a simple buffer. If the input of a buffer or inverter is 'X', then its output is 'X'; thus the X-coordinate of the output equals the X-coordinate of the input. If the circuit design contains a unit delay block (UDB) within an asynchronous crossing, then the X-channel gate corresponding to this would be a UDB; i.e., a unit-delay of the X coordinate.

Figure 12:
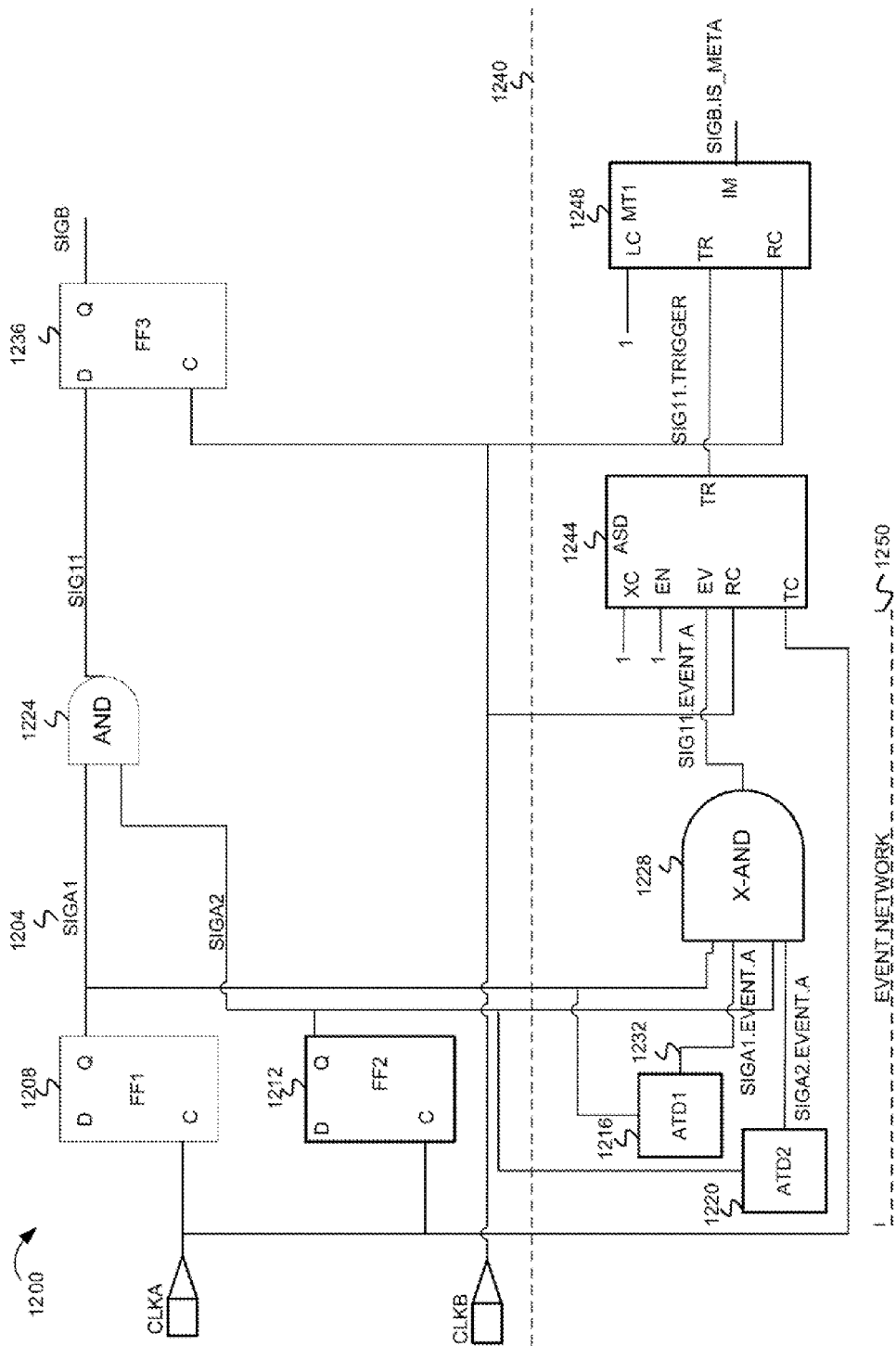
FIG. 12 illustrates shadow logic applied to a circuit design that includes a glitch prone asynchronous clock domain crossing according to an embodiment of the disclosure.

FIG. 12 is an example circuit design 1200 depicting an example glitch prone asynchronous clock domain crossing and application of shadow logic and binary/x encoding to identify potential glitches during a simulation or formal verification of the design. Some embodiments model the propagation of asynchronous events, including potential glitches, by generating a network of X-channel logic within the "shadow logic" described above. This logic can be collectively called the "event network" (e.g., event network 1250 in FIG. 12). A signal in the event network can be named after a corresponding design signal, but with a suffix of event.transmit_domain, to indicate that the signal is used to communicate asynchronous events from the given domain. A logic gate in the asynchronous crossing can have a corresponding X-channel gate in the event network. FIG. 12 illustrates inclusion of an event network 1250 that could be generated for an example circuit that may be prone to glitches. The shadow logic in the design is below the dotted line 1240. The combination of the asynchronous transition detectors, X channel logic and the signals interconnecting them is referred to as the event network 1250. Signals in the circuit design can have a corresponding signal in the shadow logic. For example, signal SIGA1 1204 has a corresponding signal SIGA1.EVENT.A 1232 in the shadow logic. Transmit domain flip-flops 1208 and 1212 are associated with a corresponding ATD 1216 and 1220 in the shadow logic. Logic gates in an asynchronous clock domain crossing can be associated with a corresponding X-channel logic gate. In the example circuit design 1200, AND gate 1224 is associated with a corresponding X-channel logic gate X-AND gate 1228. The receive domain flip-flop 1236 is associated with an ASD 1244 and a metastability timer 1248.

Figure 13:
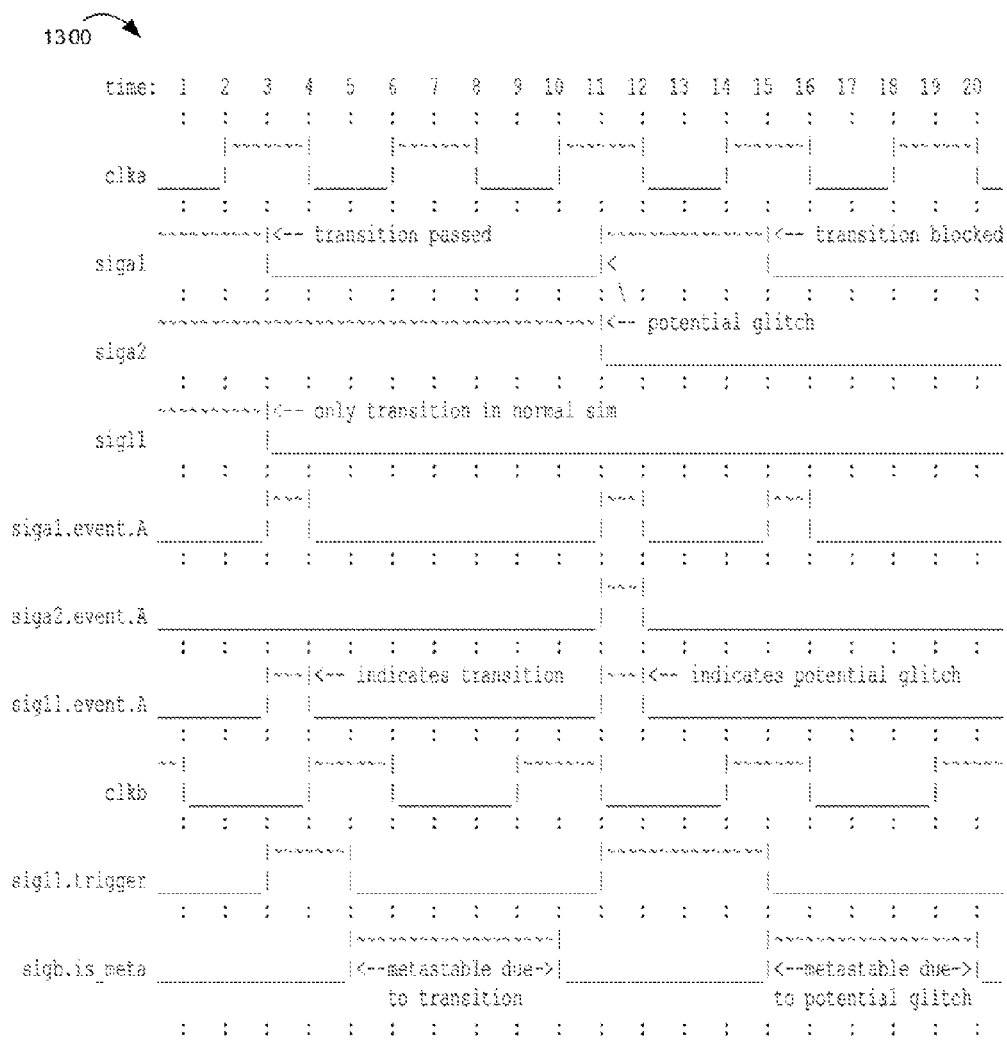
FIG. 13 illustrates a timing diagram associated with FIG. 12 according to an embodiment of the disclosure.

FIG. 13 is a timing diagram 1300 associated with the example circuit design depicted in FIG. 12. As shown in FIG. 13, the signal sig11.event.A pulses twice, first at time 3 and then at time 11, to indicate that two asynchronous events propagated to signal sig11. The first asynchronous event at time 3 is an asynchronous transition that is not a glitch as indicated by the fact that both sig11 and sig11.event.A both transitioned at time 3. The second asynchronous event is a potential glitch, indicated by the fact that sig11 does not transition at time 11 while sig11.event.A did transition at time 11. Thus, in one embodiment, the shadow logic and X-channel logic can be implemented in a computer program to identify asynchronous transitions and potential glitches in a design.

Figure 14:
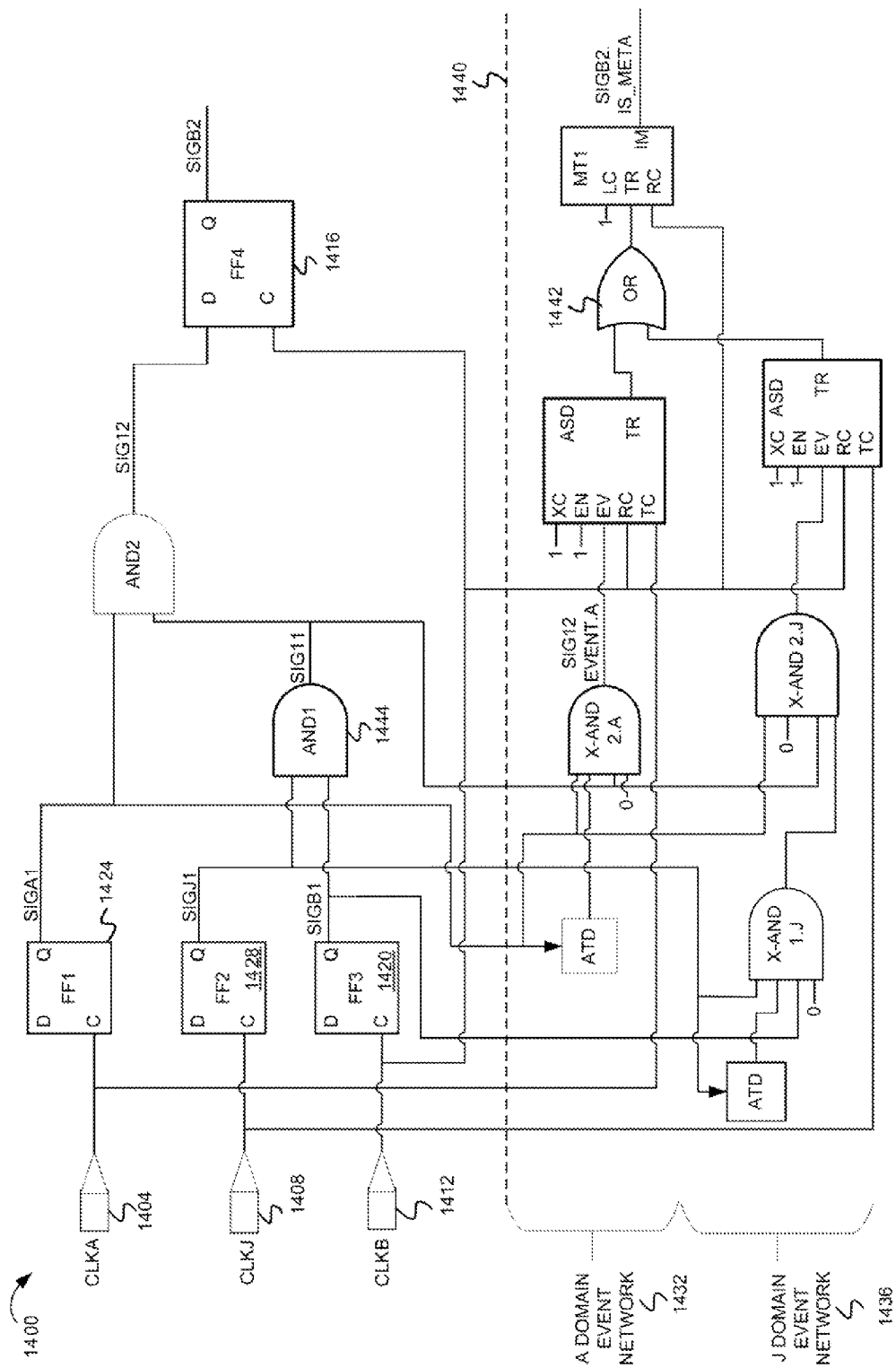
FIG. 14 illustrates shadow logic applied to a multidomain crossing according to an embodiment of the disclosure.

FIG. 14 depicts an example circuit design 1400 that includes multiple clock domains. The example circuit design 1400 includes three clock domains driven by the clock signals CLKA 1404, CLKJ 1408, and CLKB 1412. CLKB 1412 drives the state transitions associated with flip-flops 1416 and 1420. Flip-flop 1416 is the receive element of asynchronous crossings from the CLKA and CLKJ domains. Flip-flops 1416 and 1420 are both in the CLKB clock domain, which is the receive domain of the crossing to flip-flop 1416, while flip-flops 1424 and 1428 are in two separate transmit domains relative to this crossing. The shadow logic is below line 1440. The event network that corresponds to CLKA 1404 is referred to as the A domain event network 1432, and the event network that corresponds to CLKJ is referred to as the J domain event network 1436. As shown in FIG. 14, an X-channel gate's X coordinate input is tied to 0 if the corresponding logic gate's input is not sensitive to transitions from the corresponding transmit domain. The A domain event network 1432 lacks an X-channel gate corresponding to the AND1 gate 1444, because the asynchronous crossing from clock domain A to clock domain B does not pass through the AND1 gate 1444.

Figure 15:
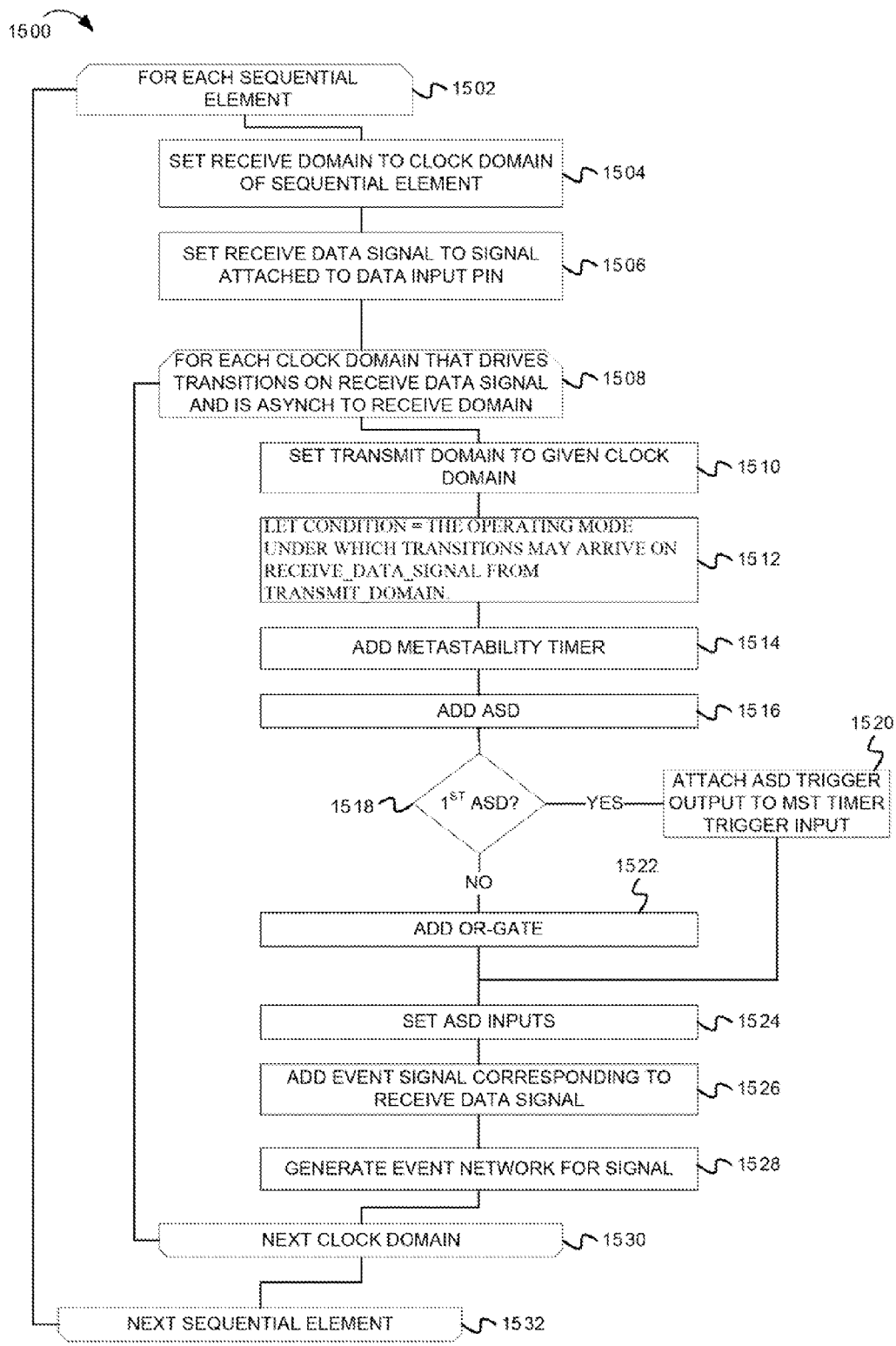
FIG. 15 is a flowchart illustrating a method to implement an event network according to an embodiment of the disclosure.

FIG. 15 is an example method 1500 to generate an event network like the event networks described in previous figures. Method 1500 begins at block 1502, which is a beginning of a loop that iterates through the sequential elements of a circuit design. For example, the loop may iterate through the transparent latches or flip-flops in a design.

At block 1504, the clock domain of the current transparent latch or flip-flop is stored in a variable designated receive_domain.

At block 1506, the data signal associated with the input of a transparent latch or flip-flop is stored in a variable designated receive_data_signal.

Block 1508 is the beginning of a loop that iterates through clock domains that drive transitions on the variable receive_data_signal and that are asynchronous to the variable receive_domain.

At block 1510, the current clock domain is stored in a variable designated transmit_domain.

At block 1512, information about the operating mode or functions of the operating mode under which transitions may arrive on the variable receive_data_signal from the transmit domain is stored in a variable designated condition. For example, if the circuit design includes a test mode, in which all sequential elements are clocked by a common test clock, then the condition variable might represent the expression "not test mode", to indicate that the given receive domain and transmit domain are asynchronous only during functional (non-test) mode. In one embodiment, the method 1500 can determine such receive domain, transmit domain and condition values by examining a phase expression calculated for the clock and data inputs to the transparent latch or flip-flop as described in U.S. Provisional Patent Application Ser. No. 61/912,345, entitled "DETECTION OF CLOCK DOMAIN CROSSINGS AND POTENTIAL DEFECTS IN A CIRCUIT DESIGN AT THE REGISTER TRANSFER LEVEL" which is incorporated herein by reference for all purposes.

At block 1514, a software based instantiation of a metastability timer is added to the design. The rcv_clock input of the metastability timer can be attached to the sample clock signal associated with the variable receive_domain. The sample clock can be an ungated version of the receive domain clock. The local_clock input of the metastability timer can be attached to the signal attached to the clock input of the transparent latch or flip-flop. If the signal attached to the clock input of the transparent latch or flip-flop is not a gated clock, then the local_clock input of the metastability timer may instead be tied to a constant 1 signal.

At block 1516, a software-based ASD is added to the design.

At block 1518, a check is made to determine if the ASD added at block 1516 is the first ASD associated with the current transparent latch or flip-flop under consideration. If the ASD is the first, then at block 1520, the ASD's trigger output is attached to the metastability timer's trigger input via a new signal referred to as the trigger signal.

If the check at block 1518 determines that the ASD added at block 1516 is not the first ASD, then at block 1522 an OR gate can be added to the design for the transparent latch or flip-flop if such an OR gate is not already associated with the transparent latch or flip-flop. When such an OR gate is added, the trigger signal that was previously attached to the metastability timer's trigger input can instead be attached to an OR gate input. The output of the OR gate can be attached to the trigger input of the metastability timer via a signal. Additionally, one of the OR gate inputs can be attached to the ASD's trigger output via a signal. OR gate 1442 depicted in FIG. 14 is an example of such an OR gate.

At block 1524, inputs to the ASD added at block 1516 are set. If the sequential element being iterated through is a transparent latch pair and the first latch in the pair has a gated clock, then the gated clock is attached to the ASD's Xc input. Otherwise, the Xc input is set to a 1. The ASD's EN input can be attached to an enable signal. The enable signal can indicate when the condition variable is true. The enable signal can be set to a 1 if the condition is always true. Other enable mechanisms can be used to drive the enable signal. For example, an enable signal can be created to allow a verification environment to selectively disable the modeling of asynchronous behavior for debug purposes. The ASD's RC input can be attached to the sample clock signal for the receive domain. The ASD's TC input can be attached to the sample clock signal for the transmit_domain if the asynchronous crossing is timed to the faster domain; otherwise, the TC input can be tied to 0.

At block 1526, a new signal can be added to the design. The new signal is referred to as receive_data_signal.event.transmit_domain, where transmit_domain is replaced by the name of the transmit domain. The new signal can be attached to the ASD's EV input. A variable referred to as receive_shadow_signal is set as a reference to the signal receive_data_signal.event.transmit.domain.

At block 1528, an event network is generated for the signal added at block 1526. A method 1600 for generating an event network for a signal is described below with reference to FIG. 16. In some embodiments, the method provides the variables receive_data_signal, receive_shadow_signal, transmit_domain, and condition to method 1600.

At block 1530, the method returns to the top of the loop to process the next clock domain, if present.

At block 1532, the method returns to the top of the loop to process the next sequential element, if present.

Figure 16:
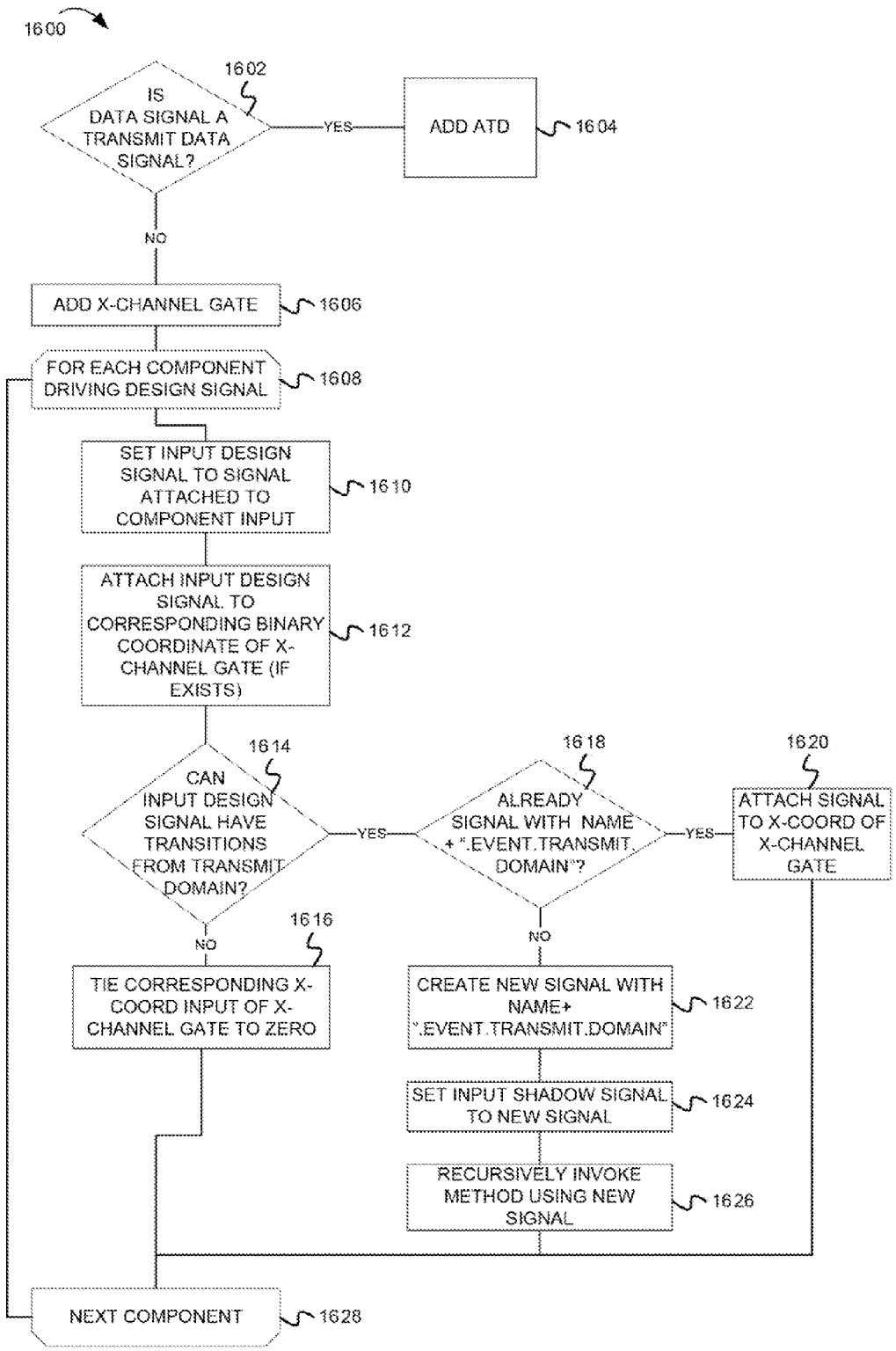
FIG. 16 is a flowchart illustrating a method to implement an event network according to an embodiment of the disclosure.

FIG. 16 is a flow chart illustrating a method 1600 for generating an event network for a signal. FIG. 16 provides further details regarding operations performed at block 1528 of FIG. 15. The variables design_signal, shadow_signal, transmit_domain, and condition each correspond to the variables receive_data_signal, receive_shadow_signal, transmit_domain, and condition respectively in the method illustrated in FIG. 16. Method 1600 begins at block 1602 with determining whether the signal referenced by design_signal is a transmit data signal, meaning, the signal attached to the output of a sequential element in the transmit domain. A transmit data signal can also refer to a primary input to the circuit that has been designated as driving transitions from the transmit domain. A transmit data signal can also refer to some other source of transitions from the transmit domain, such as the output of a "black box." If the design_signal refers to a transmit data signal, then at block 1604, an ATD is added to the design. The ATD's tmit_data input can be attached to the signal designated by the variable design_signal. The ATD's event output can be attached to the signal designated by the variable shadow_signal. If the signal associated with the variable design_signal is not always clocked by the transmit domain, then the ATD's EN input can be attached to a signal that indicates when it is so clocked. Otherwise, the ATD's EN input can be tied to 1 or to some other enable mechanism.

If the check at block 1602 determines that the signal referenced by design_signal is not a transmit data signal, then the signal is driven by combinational logic, such as an inverter, buffer, XOR, AND, or similar type of logic gate. In this case, at block 1606 an X-channel logic gate can be added to the design, where the X-channel logic gate corresponds to the logic gate that drives the signal referenced by the design_signal variable. The signal referenced by the variable shadow_signal can be attached to the output of the X-channel logic gate.

Block 1608 is the top of a loop that iterates through each input of the combinational logic component that drives the signal stored in the variable design_signal.

At block 1610, a variable designated input_design_signal stores the signal associated with the component input.

At block 1612, the corresponding binary coordinate input of the X-channel logic gate can be attached to the signal associated with the variable input_design_signal provided that the X-channel logic gate includes such a binary input. (Some such as the X-XOR gate lack such an input as discussed above.)

At decision block 1614, a check is made to determine whether the signal designated by the variable input_design_signal can have transitions from the transmit_domain under the condition. If the check determines that the input_design_signal cannot have such transitions, then at block 1616, the corresponding X-coordinate input of the X-channel gate can be tied to zero.

If the check at block 1614 determines that the input_design_signal can have such transitions, then at decision block 1618 a check is made to determine whether there is already a signal in the design with the same name as input_design_signal but with the suffix ".event.transmit_domain." If there is a signal in the design designated "input_design_signal.event.transmit_domain" then at block 1620 the signal is connected with the corresponding X coordinate input of the X-channel logic gate. The method then proceeds to block 1628.

Otherwise, at block 1622 a new signal is created in the design designated "input_design_signal.event.transmit_domain," where transmit_domain is replaced by the name of the transmit domain.

At block 1624, the variable input_shadow_signal is assigned to the newly created signal. The newly created signal is attached to the corresponding X coordinate input of the X-channel gate.

At block 1626, method 1600 is recursively invoked using input_design_signal, input_shadow_signal, transmit_domain, and condition associated with the newly created signal.

At block 1628, the end of the loop is reached. The method returns to the top of the loop to process the next component (if any) driving the design signal.

In some embodiments, if a receive element consists of two transparent latches separated by combinational logic, then corresponding X-channel logic can be added to the verification model, to take the effects of such logic on trigger signal propagation into account. This "trigger network" can be created in a manner similar to method 1600 described above, by doing a forward traversal from the first latch to the second latch.

Figure 17A:
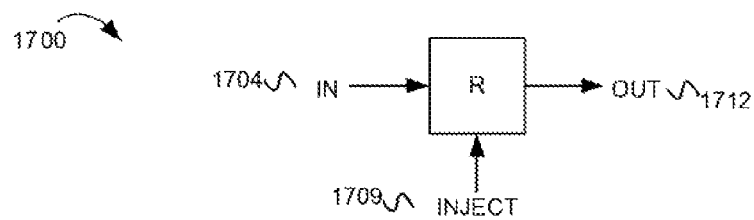
FIGS. 17A, 17B and 17C illustrate random injectors according to embodiments of the disclosure.
Figure 17B:
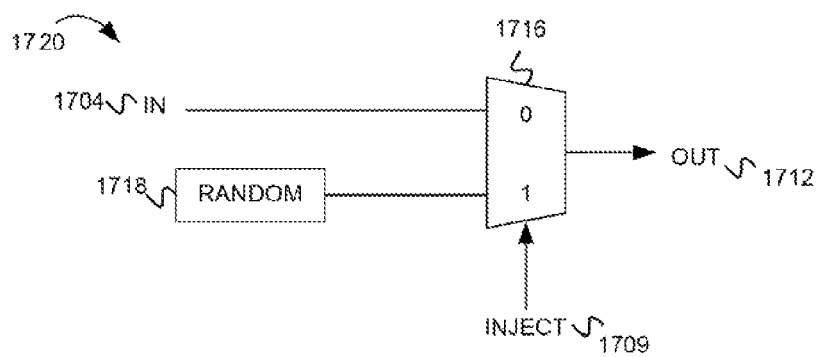
Figure 17C:
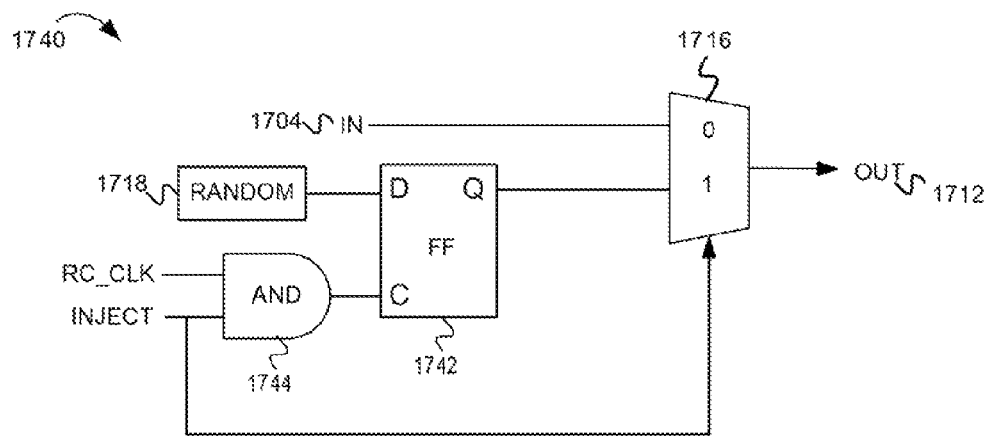

FIG. 17A depicts a random injector 1700. FIG. 17A is a high-level description of the random injector 1700 and FIGS. 17B and 17C depict implementations of the random injector 1700 using the fundamental circuit components of FIG. 4. The random injector 1700 introduces random behavior into a verification RTL model of a circuit design. The random injector 1700 includes two inputs, denoted in 1704 and inject 1709, and an output denoted out 1712. When the inject input 1709 is a 1, the output 1712 is a random value; otherwise, the output 1712 equals the input in 1704. The random injector 1700 introduces a new random value in each unit of time.

FIG. 17B depicts an implementation 1720 of the random injector 1700 using some of the fundamental circuit components of FIG. 4, including a multiplexer 1716. The multiplexer 1716 has three inputs: in 1704, random input 1718, and inject 1709. The input inject 1709 is a selector signal. When inject 1709 is a 1, it selects the random input 1718; consequently, the output out 1712 equals the random input 1718. Conversely, when inject 1709 is a 0, the output out 1712 equals the input in 1704.

FIG. 17C depicts an implementation 1740 of the random injector 1700 designed to generate a single random output for each receive clock period. Although the random injector 1700 produces a new random value in each unit of time, only one random value is needed for each receive clock period. Thus one optimization that an embodiment can make to reduce the number of signal transitions in the verification model (and thus improve verification performance) is to insert flip-flop 1742 between the random box and the multiplexer 1716, and attach the clock input of the flip-flop 1742 to a 2-input AND gate 1744, whose inputs are attached to the receive domain clock and the inject input.

Figure 18:
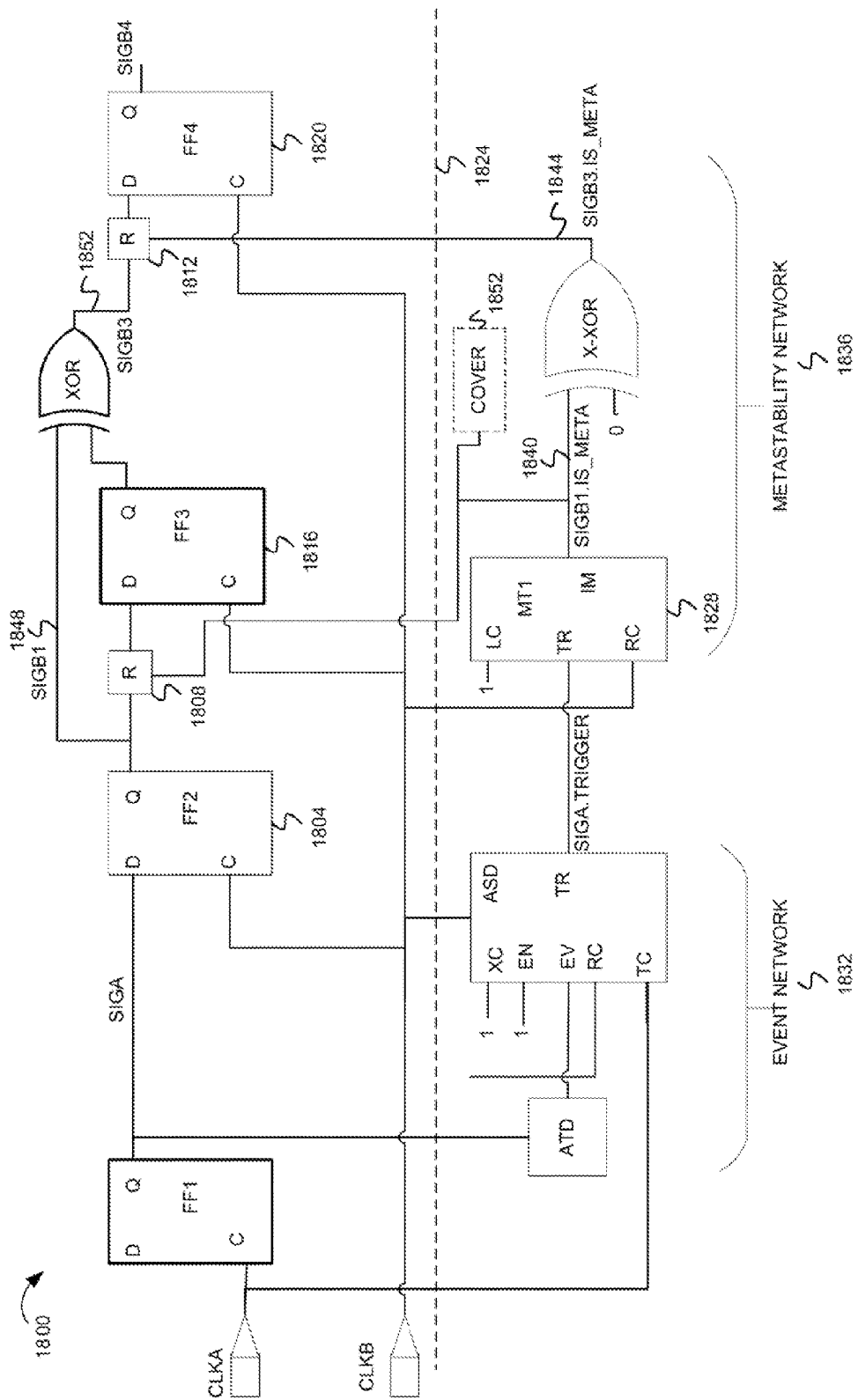
FIG. 18 illustrates an event network and a metastability network applied to an example circuit design according to an embodiment of the disclosure.

FIG. 18 depicts a design 1800 that includes an example metastability network 1836. The design depicted in FIG. 18 represents an example circuit referred to as an edge detector. The metastability network 1836 can model metastability in a design. In one embodiment, a random injector like the one described in FIGS. 17A, 17B, and 17C can be included before the data input to sequential logic components that are after a first receive domain sequential logic component. For example, the first receive sequential logic element in the design depicted in FIG. 18 is the flip-flop 1804. The random injectors 1808, 1812 are included before the flip-flops 1816, 1820. In an embodiment, shadow logic as shown below the dotted line 1824 can be implemented. The shadow logic to the right of the metastability timer 1828 is referred to as the metastability network 1836. The metastability network 1836 can include signals corresponding to the design signals in the metastability path. For example, the signal sigb1 1848 has a corresponding signal sigb1.is_meta 1840 in the metastability network 1836, and the signal sigb3 1852 has a corresponding signal sigb3.is_meta 1844 in the metastability network 1836. The signals in the metastability network 1836 indicate if a design signal is potentially metastable, or in an indeterminate state due to metastability of an upstream sequential element. For instance, if the sigb1.is_meta signal assumes a value of 1, then this is an indicator that the design signal sigb1 is nondeterministic, perhaps due to metastability in flip-flop 1804. In one embodiment, a cover box 1852 can be included as an optional element in an implementation of the design depicted in FIG. 18. The cover box 1852 represents a coverage event; specifically, that the input is sometimes equal to 1. The verification process attempts to find one or more situations in which a cover box 1852 input equals 1. A situation in which a cover box 1852 input equals 1 constitutes an event that can be reported to a user in one embodiment. Such an event can indicate to the user that the verification process is exercising the asynchronous crossing and causing potential metastability, so that the effects of such metastability can be verified.

FIG. 19 illustrates timing diagrams 1900 and 1920 associated with the example design depicted in FIG. 18. Timing diagram 1900 is a timing diagram of signals associated with FIG. 18, while timing diagram 1920 is a timing diagram of signal sigb4 1908 as a function of the values that each random injector in FIG. 18 introduces into the design. As depicted in FIG. 19, sig4b 1908 is random during two clkb 1904 cycles and zero at other times. Accordingly, the random injector permits modeling of four possible behaviors as shown in FIG. 19B. These four behaviors correspond to the four possible outcomes that metastability in the receive element of an edge detector can cause in an actual circuit implementation.

Figure 20:
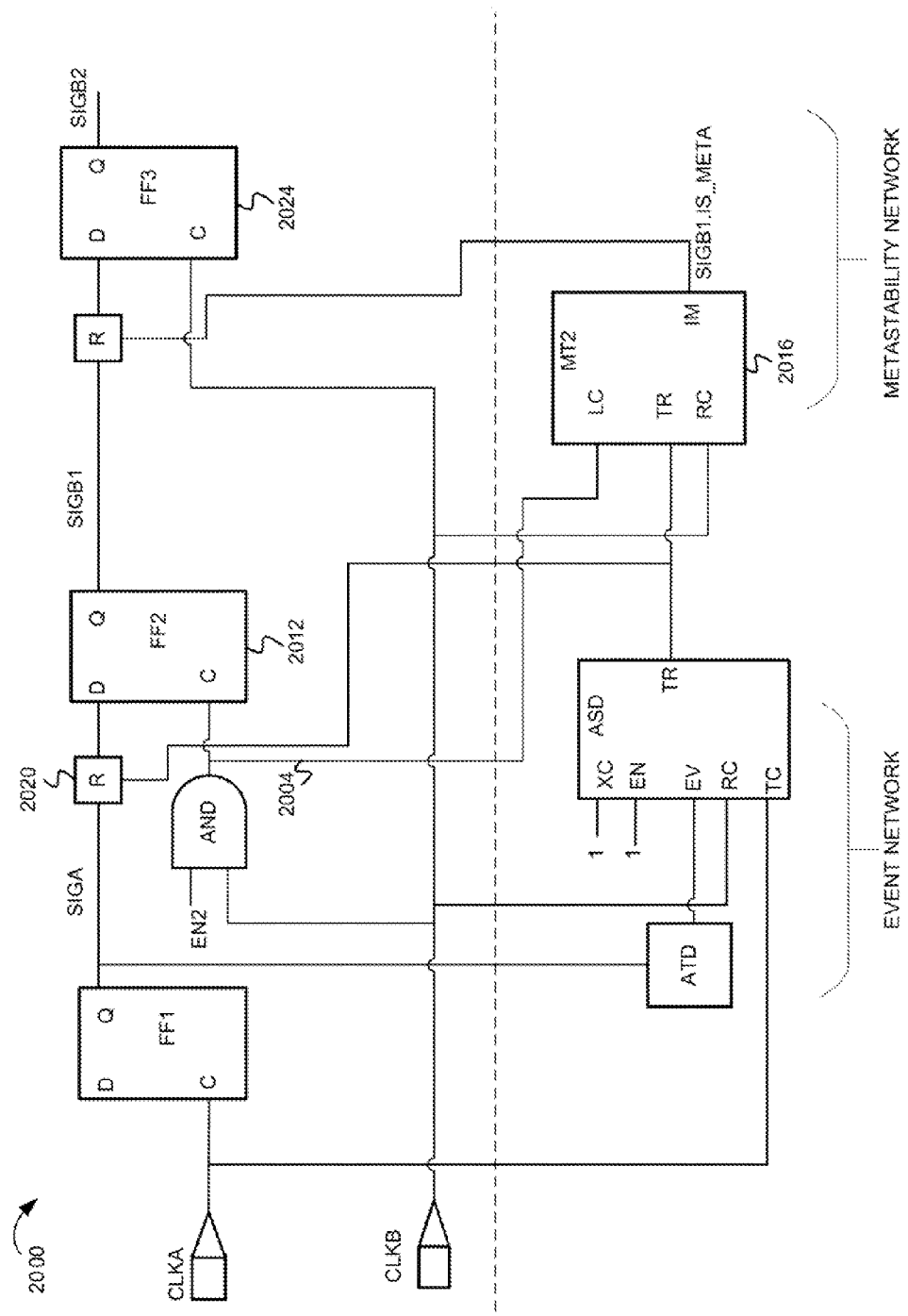
FIG. 20 illustrates an event network and a metastability network applied to an example circuit design that includes a gated clock according to an embodiment of the disclosure.

FIG. 20 depicts application of an event network and a metastability network to model metastability in an example design 2000 that includes a gated clock and a two-cycle metastability timer. In some designs, a receive element of an asynchronous crossing can have a possibly gated clock, meaning that the clock can be disabled on selected clock periods. In such cases, an embodiment modifies the verification model as indicated in FIG. 20. The clock signal 2004 associated with the flip-flop 2012 is attached to the LC input of the metastability timer 2016. Additionally, a random injector 2020 is implemented to introduce a random value beyond the period of metastability to model the settling of flip-flop 2012 to a nondeterministic value.

Figure 21:
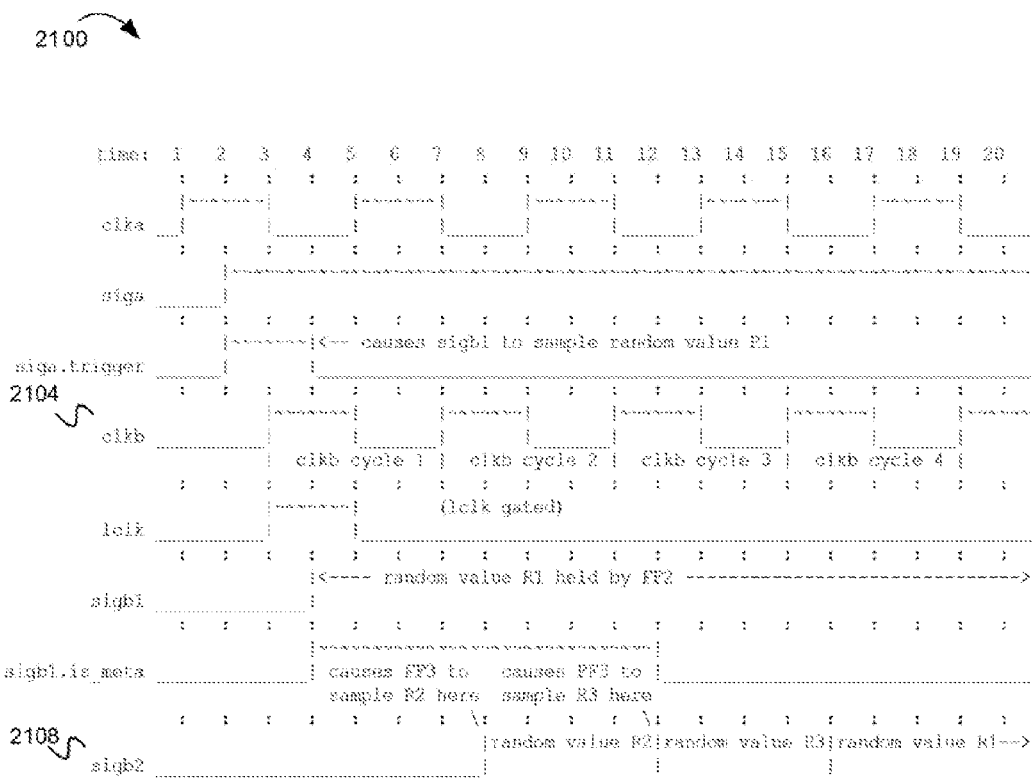
FIG. 21 is a timing diagram associated with FIG. 20 according to an embodiment of the disclosure.

FIG. 21 is a timing diagram associated with the example design shown in FIG. 20. The timing diagram shows the receive element sampling an asynchronous transition, and then being clock-gated for subsequent clock periods. On clkb 2104, cycle 2, signal sigb2 2108 has a first random value R2 due to flip-flop 2012 from FIG. 20 being metastable during cycle 1 of clkb 2104 thereby causing flip-flop 2024 to behave non-deterministically. On clkb 2104, cycle 3, signal sigb2 2108 has a second random value R3 due to flip-flop 2212 being metastable for a second clock period during clkb cycle 2. On clkb, cycle 4 and subsequently, signal sigb2 2108 has a third random value R1 which represents the final random state that flip-flop 2012 settles into after being metastable.

Figure 22:
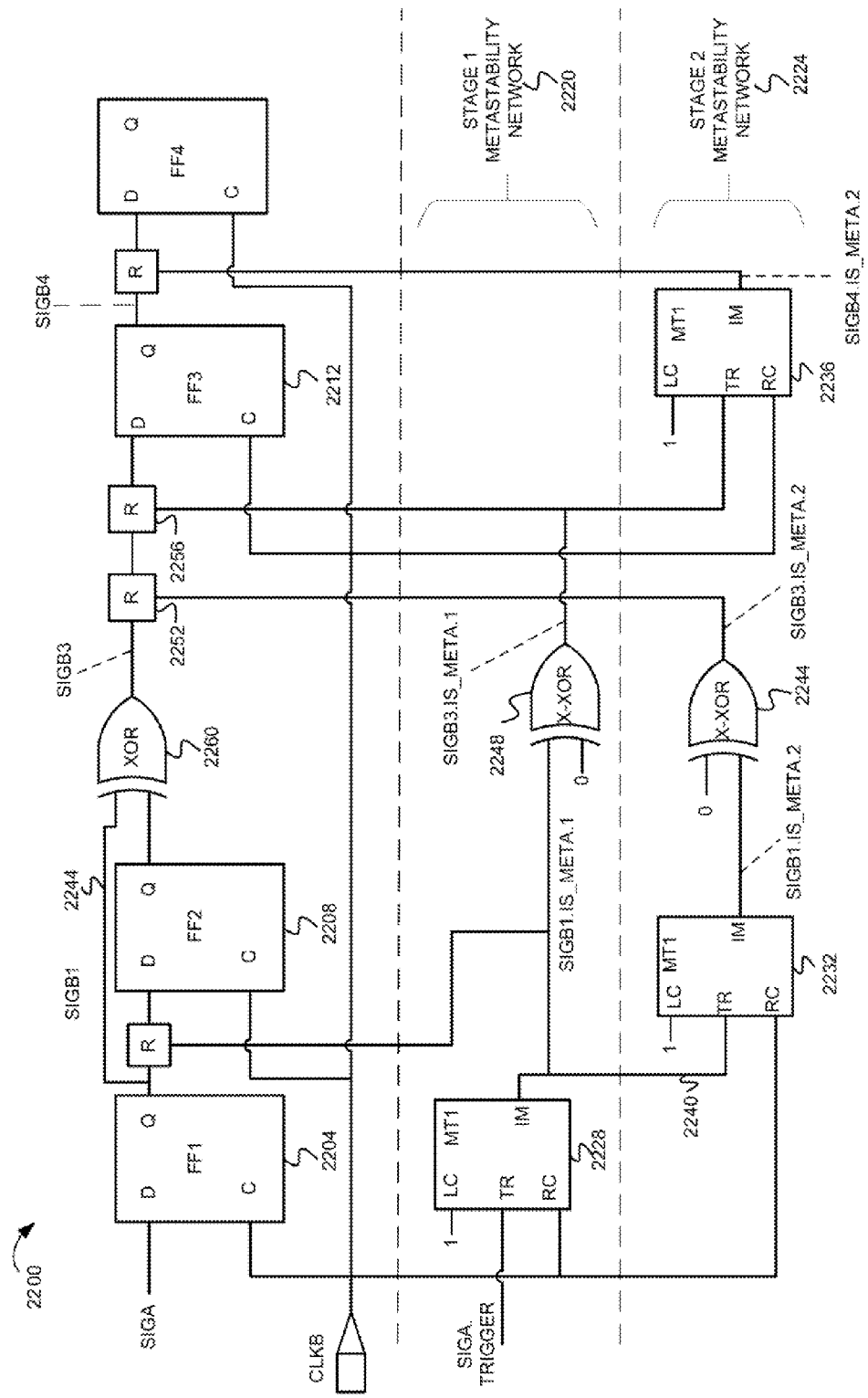
FIG. 22 illustrates application of a multi-stage metastability network to model metastability in an example circuit design according to an embodiment of the disclosure.

FIG. 22 is an example circuit design 2200 used to illustrate detection of multi-stage metastability. In the example illustrated in FIG. 22, two-stage metastability is shown. It is possible for metastability to "propagate" from one sequential element to another. If a receive element remains metastable long enough for a stage 2 element to sample a value that is between logic thresholds (similar to sampling an asynchronous transition), then there is some probability that the stage 2 element will itself become metastable. This probability will be much lower than that of the receive element becoming metastable. Integrated circuit designers will typically estimate this probability to determine whether it presents a reliability problem. If so, they may require that a synchronizer use three stages of flip-flops instead of two. The concepts described above can be extended to model multiple stages of metastability to cover this case. Whether and where such modeling should occur can be controlled by the user or design parameters, for example, by attributes in the design.

FIG. 22 depicts the receive domain of an asynchronous clock domain crossing, and a two-stage metastability network 2200. The transmit domain and the event network is omitted from FIG. 22 to avoid obscuring certain details. Stage 1 2220 of the is_meta network corresponds to signals in the design that can be nondeterministic due to the metastability of the stage 1 sequential logic element, flip-flop 2204 in the design. Metastability timer 2228 corresponds to flip-flop 2204. Stage 2 2224 corresponds to signals that can be nondeterministic due to metastability of the stage 2 elements, flip-flops 2208, 2212. The two metastability timers 2232, 2236 correspond to flip-flops 2208, 2212 respectively. The trigger input to a metastability timer for stage N, where N>1, is connected to the is_meta signal for stage N−1, corresponding to the design signal connected to the input of the sequential logic element corresponding to the metastability timer. For instance, the trigger input of metastability timer 2232 is connected to the sig1.is_meta.1 signal 2240, which corresponds to the signal SIGB1 2244 of the design. The X-channel logic for a given stage can have its X-coordinate inputs connected to is_meta signals in the same stage. The X-XOR gates 2244, 2248 each have one input tied to zero, because one input of the original XOR gate 2260 is affected by the stage 1 sequential logic element flip-flop 2204, and the other input is affected by only a stage 2 sequential logic element, flip-flop 2208. Flip-flop 2212 is both a stage 2 and a stage 3 sequential logic element, since it is downstream of both a stage 1 sequential logic element (i.e., flip-flop 2204) and a stage 2 sequential logic element (i.e., flip-flop 2208). Accordingly, flip-flop 2212 has two random injectors 2252 and 2256 at its input: one for stage 1 metastability and one for stage 2.

Figure 23:
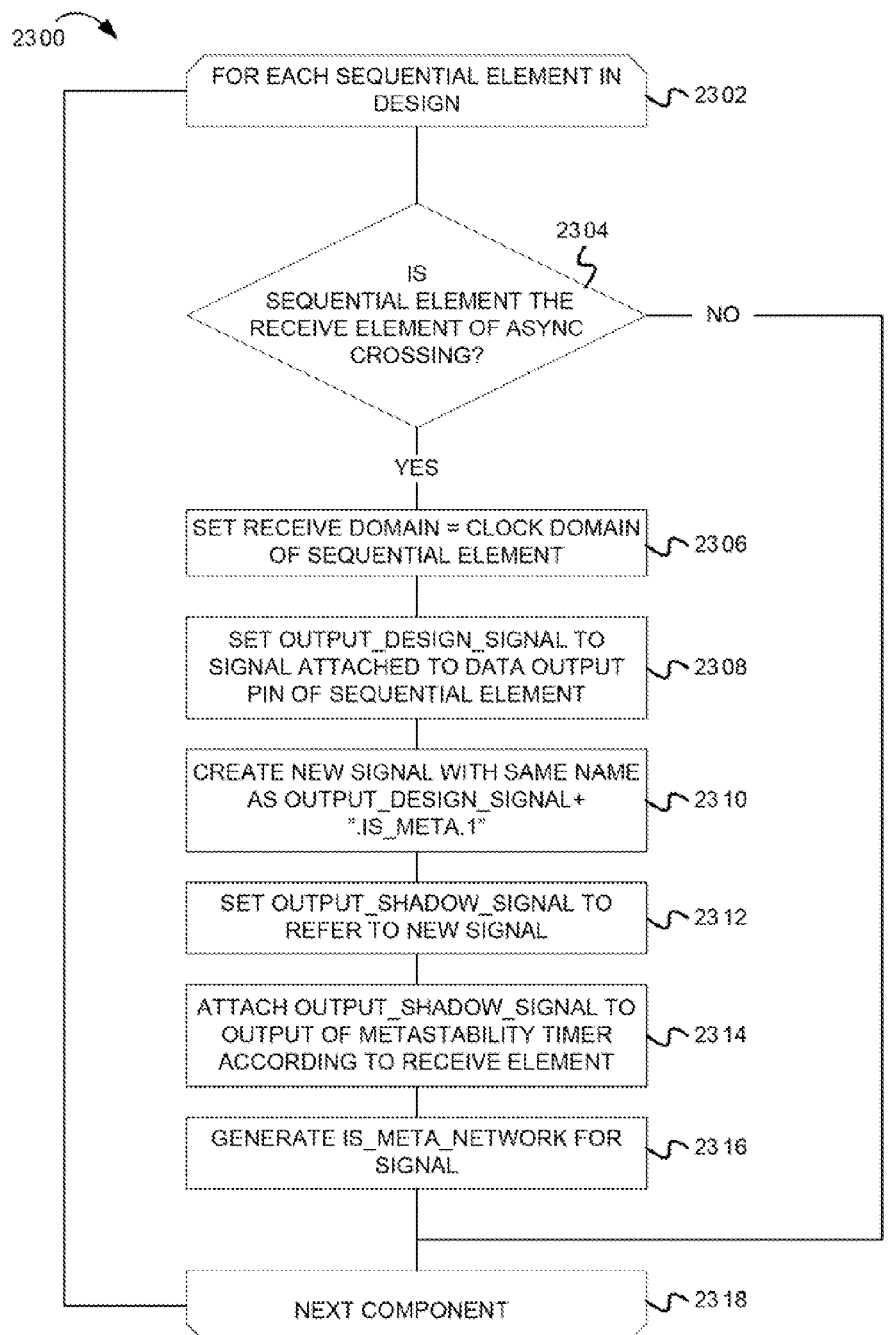
FIG. 23 is a flowchart illustrating a method for implementing a metastability network according to an embodiment of the disclosure.

FIG. 23 is a flowchart illustrating a method 2300 to implement metastability networks such as the examples described in the previous figures. In some embodiments, block 2302 is the top of a loop that iterates through sequential logic elements such as a transparent latches or flip-flops in a design At block 2304 a check is made to determine whether a sequential logic element is the receive element of an asynchronous crossing. Details on checking algorithms implemented in various embodiments to determine whether a sequential element is the receive element of an asynchronous crossing can be found in U.S. Provisional Patent Application Ser. No. 61/912,345, entitled "DETECTION OF CLOCK DOMAIN CROSSINGS AND POTENTIAL DEFECTS IN A CIRCUIT DESIGN AT THE REGISTER TRANSFER LEVEL" which has been previously incorporated by reference. If the check at block 2304 determines that a sequential logic element is the receive element of an asynchronous crossing, then at block 2306 a receive domain variable is set to the clock domain of the sequential logic element.

At block 2308, an output_design_signal variable is set to specify the signal attached to the data output pin of the current sequential logic element.

At block 2310, a new signal is added to the design. The new signal is named after the signal designated by output_design_signal, with an extension ".is_meta.1."

At block 2312, a variable denoted output_shadow_signal is set to refer to the newly created signal.

At block 2314, the newly created signal designated by output_shadow_signal is attached to the output of the metastability timer corresponding to the receive element. The metastability timer is assumed to have been added by the method 1500 of FIG. 15.

At block 2316, an is_meta network for the signal is generated. The generation of the is_meta network can use variables as input. In some embodiments, the input variables can comprise output_design_signal, output_shadow_signal, receive_domain, the whole number 1, which represents the stage number of the receive element, as described in FIG. 2, and the variable num_stages, which represents the number of stages of metastability that should be modeled.

If a design contains transparent latches instead of edge-triggered flip-flops, and such latches are not always strictly paired (and thus cannot be treated as one flip-flop per pair), then the algorithm can adjust the number of stages accordingly. For example, the number of stages could be doubled, with each latch counting as a single stage and each flip-flop counting as two stages.

Figure 24:
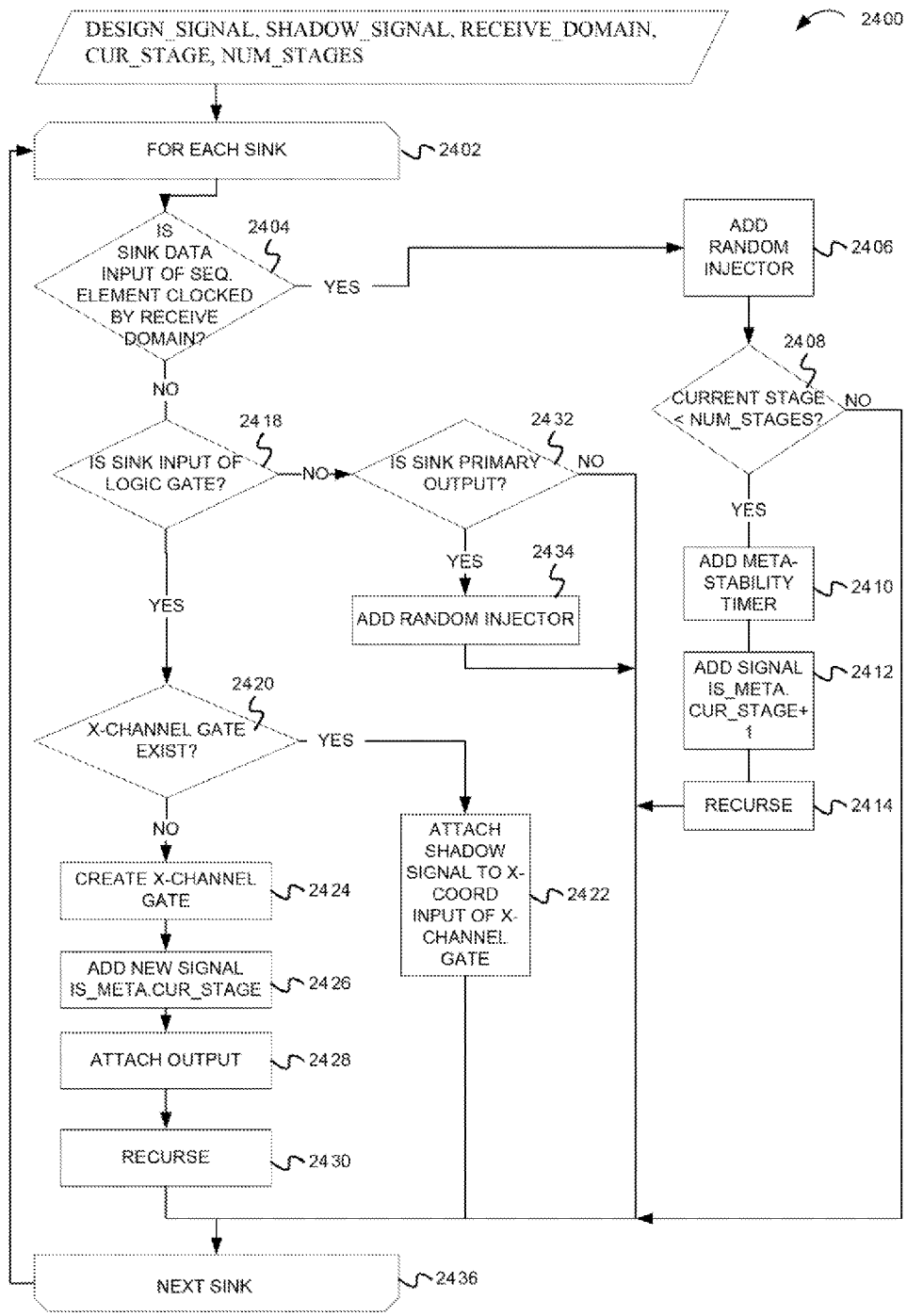
FIG. 24 is providing further details on the method illustrated in FIG. 23.

FIG. 24 is a flowchart of a method 2400 that generates an is_meta network for a signal and provides further details on the operations associated with block 2316 of FIG. 23. In some embodiments, method 2400 receives input variables design_signal, shadow_signal, receive_domain, cur_stage, num_stages, as described above with reference to block 2316.

Method 2400 begins at block 2402, which is the top of a loop that can iterate through sinks associated with the input variable design_signal.

At decision block 2404 a check is made to determine whether the sink in the current iteration is a data input of a sequential logic element clocked by the variable receive_domain or an existing random injector preceding the sequential logic element. If so, then at block 2406 a random injector is added to the design between the design_signal and the sink associated with the design_signal. The inject input of the random injector is attached to the shadow_signal provided as input.

At decision block 2408, a check is made to determine whether the variable cur_stage is less than the variable num_stages. The variable cur_stage represents the stage of the sequential logic element driving transitions on the referenced design_signal. As noted above, in the initial call to method 2400 at block 2316, the cur_stage variable is set to one. If the current stage is less than the number of stages, then a variable output_design_signal is set to store the signal associated with the output of the sequential logic element.

At block 2410, a new metastability timer is added to the design. The new metastability timer corresponds to the sequential element and cur_stage+1. The rcv_clock input of the metastability timer can be attached to the clock domain signal associated with the input variable receive_domain. The local_clock input of the metastability timer can be attached to the sequential logic element's clock if it is a gated clock. Otherwise, the local_clock input of the metastability timer is tied to 1. The trigger input of the metastability timer is attached to the signal designated by the variable shadow_signal.

At block 2412, a new signal can be added to the design. The new signal is named after the output_design_signal with the extension ".is_meta.n" where n is replaced by a number equal to cur_stage+1. The variable output_shadow_signal can be set to refer to this newly created signal. The newly created signal referred to by output_shadow_signal can be attached to the is_meta output of the metastability timer.

At block 2414, method 2400 is recursively invoked with the output_design_signal, output_shadow_signal, receive_domain, cur_stage+1, and num_stages set as input parameters for the recursive call. Upon return from the recursive call, method 2400 proceeds to block 2436, where the loop iterates to the next sink to consider.

If the check at block 2404 determines that the sink is not a data input of a sequential logic element, then at decision block 2418 a check is made to determine if the sink is an input of a logic gate. If the sink is an input of a logic gate, then at block 2420 a check is made to determine whether there is an X-channel logic gate corresponding to the design's logic gate for cur_stage. If the foregoing is true, then at block 2422 the signal designated by the variable shadow_signal can be attached to the X-coordinate input of the X-channel gate corresponding to the design logic gate input. The method then proceeds to block 2436, where the loop iterates to the next sink to consider.

Otherwise, at block 2424 an X-channel gate corresponding to the design logic gate is added to the shadow network. The binary coordinate inputs of the X-channel gate can be attached to the corresponding design signals. The X-coordinate input corresponding to the design_signal's sink can be attached to the shadow_signal. Other X-coordinate inputs can be tied to zero. The variable output_design_signal is set to refer to the design signal attached to the output of the design logic gate.

At block 2426, a new signal is created for the design. The new signal is created with the same name as the output_design_signal with an extension ".is_meta.n" where n is the number assigned to variable cur_stage.

At block 2428, the variable output_shadow_signal is set to refer to this newly created signal, and the signal is attached to the output of the new X-channel gate.

At block 2430, the method 2400 recursively calls itself. Upon return from the recursive call, method 2400 proceeds to block 2436, where the loop iterates to the next sink to consider.

If the check at block 2418 determines that the sink is not an input of a logic gate, then at decision block 2432, a check is made to determine if the sink box is a primary output, assert box or cover box, or an existing random injector preceding such a component. If so, then at block 2434 a random injector is added to the design between the signal design_signal and the existing sink. The inject input is attached to the shadow_signal provided as input. The method then proceeds to block 2436, where the loop iterates to the next sink to consider.

In some embodiments, when multiple random injectors are added in series by the method 2400, the multiple random injectors can be replaced by a single random injector whose inject input is fed by an OR-gate whose inputs are attached to the respective is_meta signals.

Figure 25:
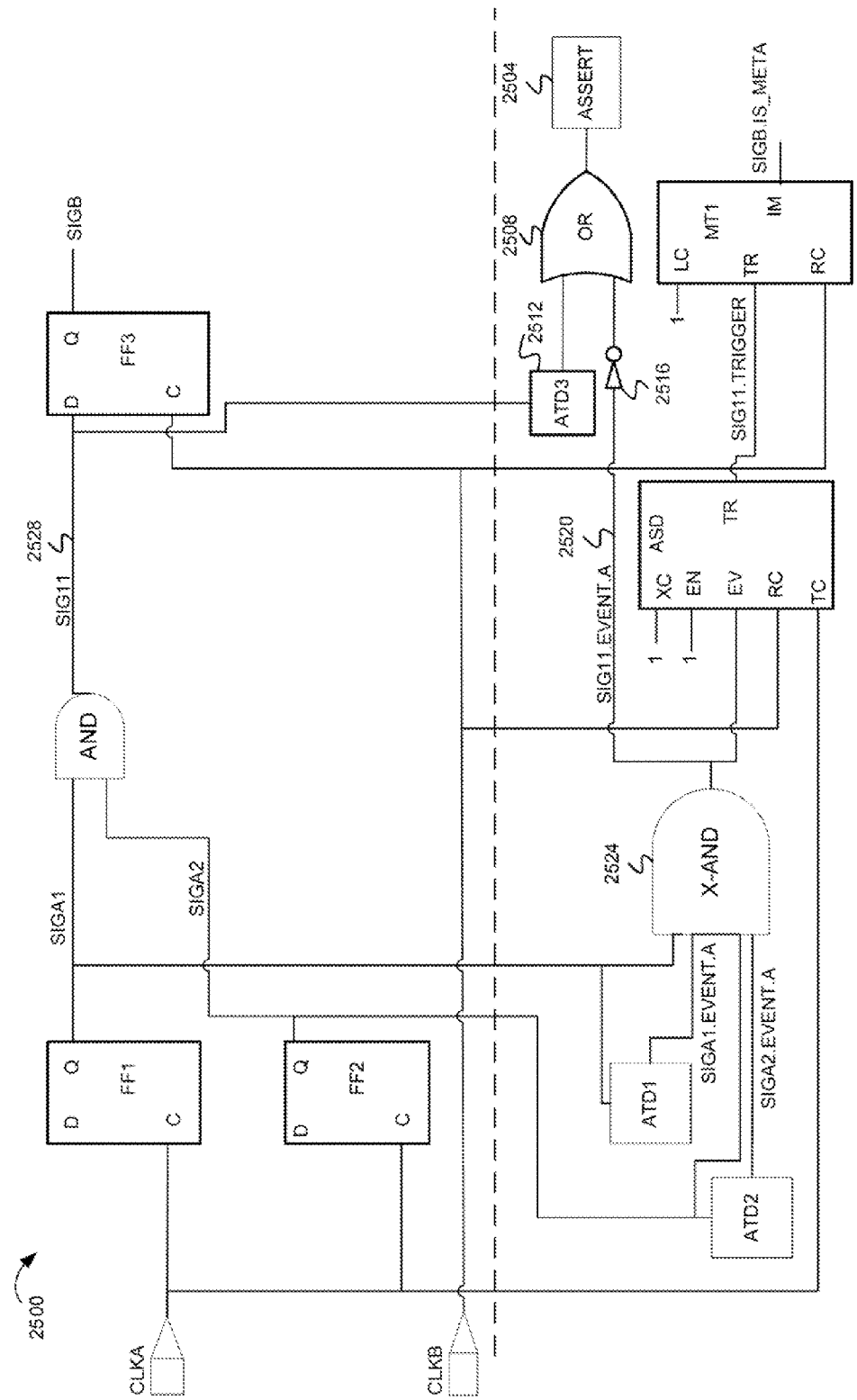
FIG. 25 illustrates application of an event network and a metastability network to an example circuit design that includes a glitch prone crossing according to an embodiment of the disclosure.
Figure 26:
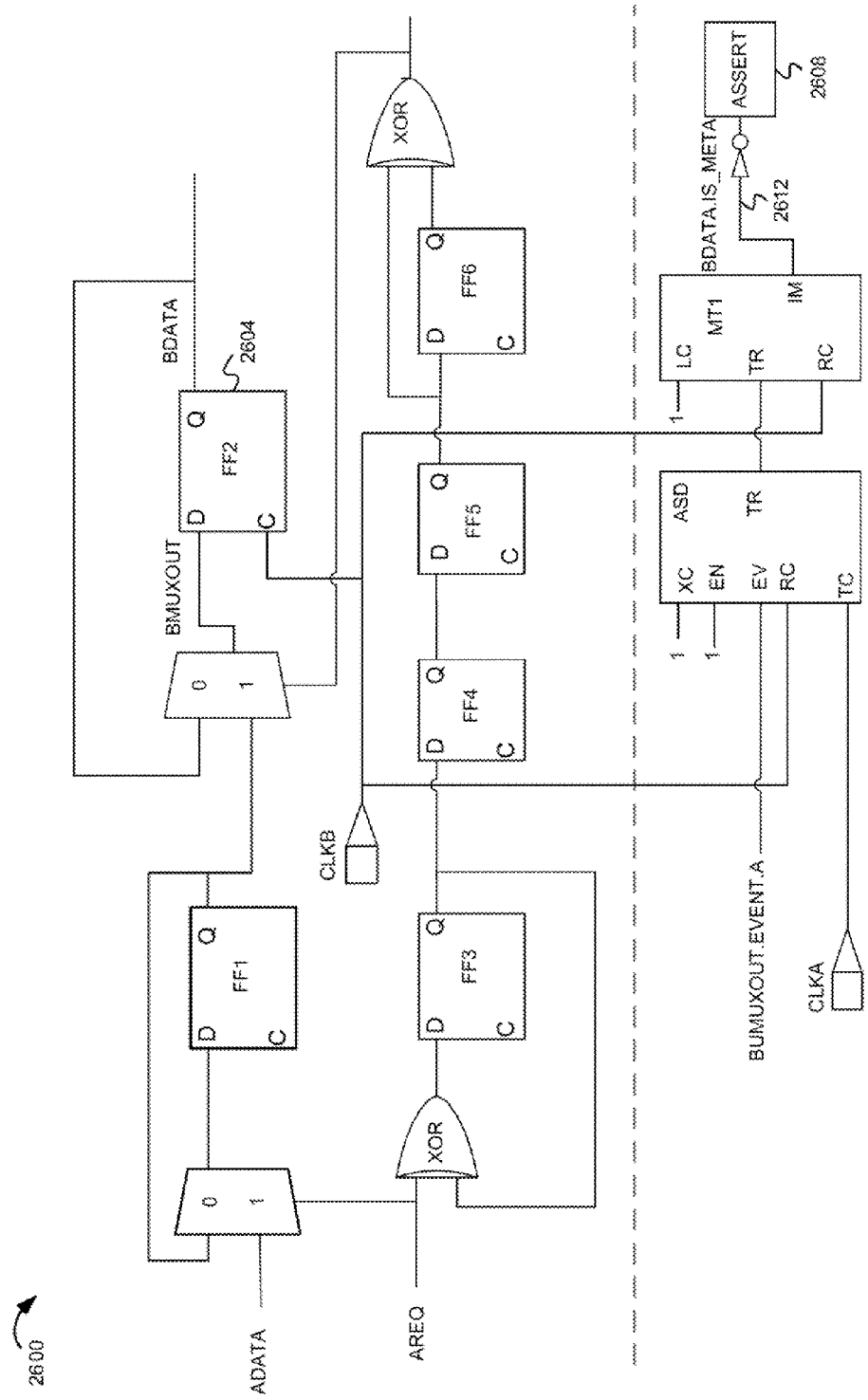
FIG. 26 illustrates application of an event network and a metastability network to an example circuit design according to an embodiment of the disclosure.

FIGS. 25 and 26 illustrate incorporation of assertions in a verification model of a circuit design. The assertion can impose a condition on a signal in a circuit so that if the condition is not satisfied then an error can be generated.

FIG. 25 illustrates use of an assertion in an example design 2500 that is to be verified as glitch free. In one embodiment, a verification model is configured to include an assert box 2504, an OR gate 2508, and an ATD 2512. The assert box 2504 generates an error if the input to the assert box 2504 is not always 1. The assert box 2504 is at the output of the OR gate 2508. The OR gate 2508 has two inputs: an ATD 2512, and an inverter 2516, inverting the sig11.event.A signal 2520, which arises from the output of the X-AND gate 2524. The input to the assert box 2504 always will be 1 provided that there is a transition on signal sig11 2528, which the ATD 2512 detects, or there is no asynchronous event on signal 11, indicated by sig11.event.A 2520 assuming a value of 0. If there is no transition on signal sig11 2528, and there is an asynchronous event indicated by sig11.event.A 2520 assuming a value of 1, then this indicates a potential glitch, as described in FIG. 13. In this case, the output of the OR gate 2508 will assume a value of 0, causing the assert box 2504 to indicate an error. Thus, the assert box 2504 can be used to indicate whether a glitch appears in the design 2500. In one embodiment, a computer program can utilize the timing_type attribute of Table 1 to determine whether an asynchronous clock domain crossing is to be glitch free, and therefore should be subject to the addition of an assert box as described in this FIG. 25. A timing_type value of async_point2point or async_glitchless indicates that the asynchronous clock domain crossing is to be glitch free. In particular, a timing_type value of async_glitchless allows the possibility of combinational logic in the crossing that is to be glitch free, and therefore should be subject to the addition of an assert box as described in FIG. 25.

FIG. 26 illustrates use of an assert box 2608 to verify that flip-flop 2604 cannot become metastable. The flip-flop 2604 will not be metastable if the flip-flop 2604 does not sample an asynchronous event. The assert box 2608 is attached to the bdata.is_meta signal 2612 through an inverter. If bdata.is_meta signal 2612 is 1, the assert box will receive a 0 input, thereby triggering a verification violation. In one embodiment, a computer program can utilize the timing_type attribute of Table 1 to determine whether the receive element of an asynchronous clock domain crossing is allowed to become metastable. In particular, a timing_type value of async_gated indicates that the receive element should not be allowed to become metastable. Embodiments detect this situation and can add an assert box to the verification model as described in FIG. 26.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 27:
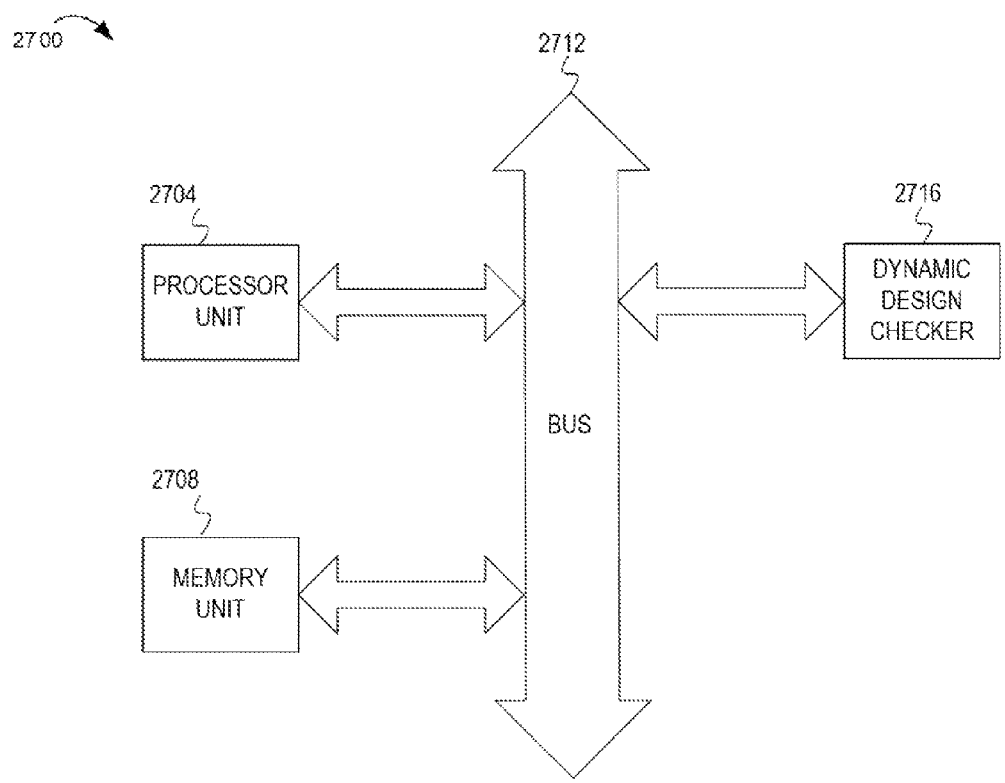
FIG. 27 is a system diagram of an example device that can implement shadow logic according to an embodiment of the disclosure.

FIG. 27 depicts an example computer system that can implement an embodiment of the disclosure. A computer system includes a processor unit 2704 (possibly including multiple processors, multiple cores, multiple nodes, and/or implementing multi-threading, etc.). The computer system includes memory 2708. The memory 2708 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 2712 (e.g., PCI, ISA, PCI-Express, HyperTransport®, InfiniBand®, NuBus, etc.), a network interface (e.g., an ATM interface, an Ethernet interface, a Frame Relay interface, SONET interface, wireless interface, etc.) (not depicted), and a storage device(s) (e.g., optical storage, magnetic storage, etc.) (not depicted). The system memory 2708 embodies functionality to implement embodiments described above. The system memory 2708 may include one or more functionalities that facilitate implementation of the shadow logic in a verification model. Any one of these functionalities may be partially (or entirely) implemented in hardware and/or on the processing unit 2704. For example, the functionality may be implemented with an application specific integrated circuit, in logic implemented in the processing unit 2704, in a co-processor on a peripheral device or card, etc. Further, realizations may include fewer or additional components not illustrated in FIG. 27 (e.g., video cards, audio cards, additional network interfaces, peripheral devices, etc.). The processor unit 2704, the storage device(s), and the network interface might be coupled to the bus 2712. Although illustrated as being coupled to the bus 2712, the memory 2708 may be coupled to the processor unit 2704. A dynamic design checker 2716 also can implement the shadow logic generation and design verification systems and methods described above. The dynamic design checker unit 2716 can be implemented in any combination of software, hardware, or both.

While the embodiments are described with reference to various implementations and exploitations, it will be understood that these embodiments are illustrative and that the scope of the inventive subject matter is not limited to them. In general, techniques for modifying a verification model to identify glitches and model metastability as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method implemented by an electronic design tool to perform verification of asynchronous clock domain crossings of a circuit design, the method comprising:
   receiving a circuit model, the circuit model including an asynchronous crossing between a first set of one or more logic components in a first clock domain and a second set of one or more logic components in a second clock domain;
   constructing a shadow network corresponding to the asynchronous crossing, the shadow network including at least one of an asynchronous transition detector, an asynchronous sample detector, and a metastability timer, the shadow network including shadow network signals corresponding to signals of the asynchronous crossing;
   transmitting, on the shadow network, a first indicator in response to a transition occurring on a transmit element of the first set of one or more logic components; and
   receiving, on the shadow network, a second indicator, the second indicator specifying an occurrence of at least one of an asynchronous transition or a potential glitch at an input of a receive element in the second set of one or more logic components.

2. The method of claim 1, further comprising latching the second indicator until a next clock edge is selected in response to determining whether the asynchronous crossing is timed to a faster domain or a receive domain.

3. The method of claim 1, further comprising including X-channel logic in the shadow network in response to determining that a signal in the circuit model is driven by combinational logic, wherein the X-channel logic produces an X coordinate that corresponds to the combinational logic, and wherein the X coordinate indicates a nondeterministic state.

4. The method of claim 1, wherein the shadow network includes a metastability network, the metastability network corresponding to a path from a receive element in the second set of one or more logic components to a subsequent stage of the second set of one or more logic components, and wherein the method further comprises:
   transmitting a third indicator on the metastability network on a clock period following a sample of an asynchronous transition or a potential glitch by a receive element in the second set of one or more logic components; and
   receiving a fourth indicator from the metastability network at an output corresponding to the subsequent stage.

5. The method of claim 4, further comprising including X-channel logic in the metastability network in response to determining that a signal in the circuit model is driven by combinational logic, wherein the X-channel logic produces an X coordinate that corresponds to the combinational logic.

6. The method of claim 4, further comprising injecting a random value into an element of the subsequent stage in response to receiving the fourth indicator.

7. The method of claim 1, further comprising including an assert box into the shadow network, wherein the assert box compares an input value to an expected value and in response to determining that the input value is different from the expected value, generates an error output.

8. The method of claim 1, further comprising including a cover box into the shadow network, wherein in response to determining that there has been at least one occurrence of an input value to the cover box matching an expected value associated with the cover box, the cover box generates a coverage event indicator output.

9. A computer program product for verifying circuit designs with asynchronous crossings, the computer program product comprising a computer readable storage medium having program instructions embodied therewith, the program instructions executable by a processor to cause the processor to perform operations comprising:
   receiving a circuit model, the circuit model including an asynchronous crossing between a first set of one or more logic components in a first clock domain and a second set of one or more logic components in a second clock domain;

constructing a shadow network corresponding to the asynchronous crossing, the shadow network including at least one of an asynchronous transition detector, an asynchronous sample detector, and a metastability timer, the shadow network including shadow network signals corresponding to signals of the asynchronous crossing;

transmitting, on the shadow network, a first indicator in response to a transition occurring on a transmit element of the first set of one or more logic components; and receiving, on the shadow network, a second indicator, the second indicator specifying an occurrence of at least one of an asynchronous transition or a potential glitch at an input of a receive element in the second set of one or more logic components.

10. The computer program product of claim 9, wherein the operations further comprise latching the second indicator until a next clock edge is selected in response to determining whether the asynchronous crossing is timed to a faster domain or a receive domain.

11. The computer program product of claim 9, wherein the operations further comprise including X-channel logic in the shadow network in response to determining that a signal in the circuit model is driven by combinational logic, wherein the X-channel logic produces an X coordinate that corresponds to the combinational logic, and wherein the X coordinate indicates a nondeterministic state.

12. The computer program product of claim 9, wherein the shadow network includes a metastability network, the metastability network corresponding to a path from a receive element in the second set of one or more logic components to a subsequent stage of the second set of one or more logic components, and wherein the operations further comprise:

transmitting a third indicator on the metastability network on a clock period following a sample of an asynchronous transition or a potential glitch by a receive element in the second set of one or more logic components; and receiving a fourth indicator from the metastability network at an output corresponding to the subsequent stage.

13. The computer program product of claim 12, wherein the operations further comprise including X-channel logic in the metastability network in response to determining that a signal in the circuit model is driven by combinational logic, wherein the X-channel logic produces an X coordinate that corresponds to the combinational logic.

14. The computer program product of claim 12 wherein the operations further comprise injecting a random value into an element of the subsequent stage in response to receiving the fourth indicator.

15. The computer program product of claim 9, wherein the operations further comprise including an assert box into the shadow network, wherein the assert box compares an input value to an expected value and in response to determining that the input value is different from the expected value, generates an error output.

16. The computer program product of claim 9, wherein the operations further comprise including a cover box into the shadow network, wherein in response to determining that there has been at least one occurrence of an input value to the cover box matching an expected value associated with the cover box, the cover box generates a coverage event indicator output.

17. A system comprising:
at least one processor; and
a computer readable storage medium communicably coupled to the at least one processor, the computer readable storage medium having program instructions embodied therewith, the program instructions executable by the at least one processor to cause the at least one processor to:

receive a circuit model, the circuit model including an asynchronous crossing between a first set of one or more logic components in a first clock domain and a second set of one or more logic components in a second clock domain;

construct a shadow network corresponding to the asynchronous crossing, the shadow network including at least one of an asynchronous transition detector, an asynchronous sample detector, and a metastability timer, the shadow network including shadow network signals corresponding to signals of the asynchronous crossing;

transmit, on the shadow network, a first indicator in response to a transition occurring on a transmit element of the first set of one or more logic components; and receive, on the shadow network, a second indicator, the second indicator specifying an occurrence of at least one of an asynchronous transition or a potential glitch at an input of a receive element in the second set of one or more logic components.

18. The system of claim 17, wherein the program instructions executable by the at least one processor further cause the at least one processor to latch the second indicator until a next clock edge is selected in response to a determination whether the asynchronous crossing is timed to a faster domain or a receive domain.

19. The system of claim 17, wherein the program instructions executable by the at least one processor further cause the at least one processor to include X-channel logic in the shadow network in response to a determination that a signal in the circuit model is driven by combinational logic, wherein the X-channel logic produces an X coordinate that corresponds to the combinational logic, and wherein the X coordinate indicates a nondeterministic state.

20. The system of claim 17, wherein the shadow network includes a metastability network, the metastability network corresponding to a path from a receive element in the second set of one or more logic components to a subsequent stage of the second set of one or more logic components, and wherein the program instructions executable by the at least one processor further cause the at least one processor to:

transmit a third indicator on the metastability network on a clock period following a sample of an asynchronous transition or a potential glitch by a receive element in the second set of one or more logic components; and receive a fourth indicator from the metastability network at an output corresponding to the subsequent stage.

* * * * *